United States Patent
Xu et al.

(10) Patent No.: US 10,534,164 B2
(45) Date of Patent: Jan. 14, 2020

(54) DIGITAL MICROSCOPE AND FOCUSING METHOD THEREOF

(71) Applicant: HANGZHOU SHUNLI OPTOTECH CO., LTD., Hangzhou, Zhejiang (CN)

(72) Inventors: Jiajun Xu, Zhejiang (CN); Pinqi Lou, Zhejiang (CN); Ye Gong, Zhejiang (CN)

(73) Assignee: HANGZHOU SHUNLI OPTOTECH CO., LTD., Hangzhou, Zhejiang (CN)

( * ) Notice: Subject to any disclaimer, the term of this patent is extended or adjusted under 35 U.S.C. 154(b) by 191 days.

(21) Appl. No.: 15/630,563

(22) Filed: Jun. 22, 2017

(65) Prior Publication Data
US 2017/0285319 A1   Oct. 5, 2017

Related U.S. Application Data

(63) Continuation of application No. PCT/CN2014/094481, filed on Dec. 22, 2014.

(51) Int. Cl.
| | | |
|---|---|---|
| G02B 7/38 | (2006.01) | |
| G02B 21/24 | (2006.01) | |
| G02B 21/36 | (2006.01) | |

(52) U.S. Cl.
CPC ............ *G02B 21/245* (2013.01); *G02B 7/38* (2013.01); *G02B 21/241* (2013.01); *G02B 21/365* (2013.01)

(58) Field of Classification Search
None
See application file for complete search history.

(56) References Cited

U.S. PATENT DOCUMENTS

| | | | | |
|---|---|---|---|---|
| 5,028,773 A | * | 7/1991 | Hata | ....................... G02B 7/102 250/201.2 |
| 5,287,223 A | * | 2/1994 | Hirasawa | ............... G02B 7/105 348/345 |

(Continued)

FOREIGN PATENT DOCUMENTS

| | | |
|---|---|---|
| CN | 101040203 A | 9/2007 |
| CN | 101706609 A | 5/2010 |

(Continued)

OTHER PUBLICATIONS

English translation of the International Search Report dated Aug. 5, 2015, for corresponding International Application No. PCT/CN2014/094481, filed Dec. 22, 2014.

(Continued)

*Primary Examiner* — Reza Aghevli
(74) *Attorney, Agent, or Firm* — David D. Brush; Westman, Champlin & Koehler, P.A.

(57) ABSTRACT

A digital microscope and a focusing thereof are provided. The microscope integrates a focusing lens unit, a zooming lens unit and related control circuits into the interior of the microscope. The control unit executes a focus searching algorithm and focus tracking algorithm, controls movement of the focusing lens unit and the zooming lens unit and achieves auto-focus by adjusting the image distance and makes the microscope zoom by adjusting the focal length. This improves the focusing efficiency and shortens the focusing time greatly. The microscope can achieve continuous zooming and tracking by the zoom tracking algorithm and the image is kept clear in the zooming process. The microscope adjusts the brightness of the assist light source at the front end of the microscope according to the change of the amount of light transmission by the control unit (Continued)

executing the exposure algorithm to ensure uniform exposure.

22 Claims, 13 Drawing Sheets

(56) References Cited

U.S. PATENT DOCUMENTS

| | | | | |
|---|---|---|---|---|
| 5,406,345 | A | * | 4/1995 | Hirasawa ............... G02B 7/102 396/86 |
| 9,389,408 | B2 | | 7/2016 | Hou et al. |
| 2005/0046308 | A1 | * | 3/2005 | Endo ...................... H02N 2/142 310/317 |
| 2007/0058054 | A1 | | 3/2007 | Kagayama et al. |
| 2008/0025715 | A1 | * | 1/2008 | Ishii ....................... G02B 7/282 396/105 |
| 2013/0035673 | A1 | * | 2/2013 | Lang ...................... A61F 9/008 606/4 |

FOREIGN PATENT DOCUMENTS

| | | |
|---|---|---|
| CN | 203406947 U | 1/2014 |
| CN | 103702027 A | 4/2014 |
| CN | 103858426 A | 6/2014 |
| CN | 103955051 A | 7/2014 |
| CN | 104133288 A | 11/2014 |

OTHER PUBLICATIONS

Written Opinion of the International Searching Authority dated Aug. 5, 2015, for corresponding International Application No. PCT/CN2014/094481, filed Dec. 22, 2014.

English translation of the International Preliminary Report on Patentability dated Aug. 5, 2015, for corresponding International Application No. PCT/CN2014/094481, filed Dec. 22, 2014.

English translation of the Chinese Office Action dated Oct. 24, 2017 for CN application 201410803622.8.

Yi, Qiushi et al., "Design and Implementation of Optical Auto-Focus Microscopy", Computer Engineering and Applications, vol. 43, No. 27, Dec. 31, 2007 (Dec. 31, 2007), ISSN: ISSN 1002-8331, pp. 119, 120 and 215. English Abstract.

* cited by examiner

DIGITAL MICROSCOPE AND FOCUSING METHOD THEREOF

CROSS-REFERENCE TO RELATED APPLICATIONS

This application is continuation of International Application No. PCT/CN2014/094481, filed Dec. 22, 2014, the content of which is incorporated herein by reference in its entirety, and published as WO 2016/101092 on Jun. 30, 2016, not in English.

FIELD

The present disclosure relates to microscope fields, and more particularly, to a digital microscope and a focusing method thereof.

BACKGROUND

A conventional focusing way of the microscope is a manual way. This focusing way is dependent on subjective judgment completely, which results in a poor focusing efficiency. Especially, when there are a large amount of objects, it can cause visual fatigue of the operator easily. This reduces focusing precision for the objects and causes tired feeling for the operator.

Most of related auto-focusing microscopes control the stage or the main body of the microscope to move to search a preset object distance, thereby achieving auto-focus, as shown in FIG. 1. Adjustable range of this method is limited and when the object is big, support for the microscope needs to be very long to achieve proper focusing. This is inconvenient for manual observation and use.

A work distance of a conventional microscope is usually fixed because the image distance of the conventional microscope is fixed and the magnification of the objective lens is also fixed. It can be learned from the optical system that when the magnification and the image distance are fixed, the object distance is also fixed, i.e., the work distance is fixed. The stage of the conventional microscope moves according to different objects to find the object distance for clear imaging and correct focusing. The fixed work distance would cause that when the object is high, the microscope cannot achieve correct focusing because length of the support of the microscope is limited.

When observing different-size objects, the conventional microscope changes different objective lens to achieve zooming. This zooming microscope does not have auto-focusing function. Therefore, it needs to adjust the stage manually under a small magnification firstly to achieve correct focusing, and then to achieve zooming operation. This reduces work efficiency greatly. Furthermore, if the correct focusing is not done under the small magnification, then clear image cannot be formed in the subsequent zooming operation.

During the movement of the stage of the conventional microscope, the distance between the object and the microscope keeps changing and the amount of light transmission of the microscope changes too. The conventional microscope does not consider change of the amount of light transmission of the microscope. This causes overexposure or light lack of the image during the movement of the stage. The two situations will influence time and result of auto-focus of the microscope.

SUMMARY

Based on one aspect of the embodiment of the present disclosure, the present disclosure provides a focusing method of a digital microscope. The method includes:

maintaining the position between an object and a main body of the microscope;

a control unit controlling a focusing lens unit in the main body of the microscope to move to make the microscope auto-focus by adjusting an image distance;

outputting image data of the object through an interface unit in the main body of the microscope to display.

Further, adjusting the image distance, includes:

searching the image distance by the control unit controlling the focusing lens unit in the main body of the microscope to move to make the microscope auto-focus with a fixed work distance of the microscope.

Further, adjusting the image distance, includes:

changing the image distance by the control unit controlling the focusing lens unit in the main body of the microscope to move to make the microscope auto-focus with a changeable work distance of the microscope.

Further, adjusting the image distance, includes:

changing the image distance by the control unit controlling a lens unit in the main body of the microscope to move to make the microscope auto-focus with a changeable work distance of the microscope in a continuous zooming process, the lens unit including the focusing lens unit and a zooming lens unit.

Further, the control unit controlling the focusing lens unit in the main body of the microscope to move to make the microscope auto-focus by adjusting the image distance, includes:

the control unit executing a focus searching algorithm to obtain the best focus value by the focus searching algorithm, the focus searching algorithm controlling a focusing motor in the main body of the microscope to drive the focusing lens unit in the main body of the microscope to make the focusing lens unit move to a position corresponding to the best focus value under control of the focus searching algorithm.

Further, the focus searching algorithm includes a raw focus searching algorithm and a fine focus searching algorithms;

the raw focus searching algorithm searches a range corresponding to the best focus value using an adaptive step which is larger than a step used in the fine focus searching algorithm, and drives the focusing lens unit into the range corresponding to the best focus value;

the fine focus searching algorithm searches the position corresponding to the best focus value in the range determined by the raw focus searching algorithm using a fixed step and drives the focusing lens unit to the position corresponding to the best focus value.

Further, the raw focus searching algorithm and the fine focus searching algorithm include steps of determining a focus value used in the focus searching algorithm:

after the focusing lens unit is driven by the control of the focus searching algorithm to a searching position, the control unit obtaining the image data of the object from a sensor board in the main body of the microscope;

dividing the image data into a plurality of sub areas and processing the image data corresponding to each sub area to obtain a high-frequency component focus value and a low-frequency component focus value corresponding to each sub area;

analyzing the high-frequency component focus value and the low-frequency component focus value corresponding to each sub area by a preset focus value selection algorithm and determining whether the high-frequency component focus value or the low-frequency component focus value is selected to perform the focus searching to determine the best focus value.

Further, the method further includes a step:

the control unit controlling the zooming lens unit and the focusing lens unit in the main body of the microscope to move to make the microscope zoom by changing a focal length, which including:

receiving an outer zooming control signal through the interface unit;

the control unit executing a zoom tracking algorithm according to the outer zooming control signal, the zoom tracking algorithm controlling a zoom motor and a focus motor to drive the zooming lens unit and the focusing lens unit to achieve zooming and the image formed by the microscope being kept clear by the zoom tracking algorithm in the zooming process.

Further, after the zooming is complete, the method further includes:

after the zooming step, the control unit executing the focus searching algorithm again to implement a more precise auto-focus.

Further, the method further includes a step of auto-adjusting brightness of a light source, which includes:

the control unit processing the image data obtained from a sensor board in the main body of the microscope to obtain image brightness information;

comparing the image brightness information to preset brightness information and calculating brightness adjustment information;

the control unit adjusting the brightness of an assist light source on the head of the main body of the microscope according to the brightness adjustment information.

Further, the method further includes:

receiving an outer brightness adjusting signal through the interface unit and sending the outer brightness adjusting signal to the control unit;

the control unit further configured to achieve manual adjustment of the brightness of the assist light source according to the outer brightness adjusting signal.

Based on another aspect of the embodiment of the present disclosure, the present disclosure also provides a digital microscope. The digital microscope includes:

a lens module, including a focusing lens unit, a focus motor and a lens-unit-position detecting unit, the focus motor configured to drive the focusing lens unit to move under the control of a control unit; the lens-unit-position detecting unit configured to detect the position of the focusing lens unit and send the position information of the focusing lens unit to the control unit;

a sensor board, configured to convert optical signals into image signals and output the image signals to the control unit;

the control unit, configured to process the image signals when the object and a main body of the digital microscope are fixed, and control the focus motor to drive the focusing lens unit to move by executing the focus searching algorithm, and make the microscope auto-focus by adjusting an image distance;

an interface unit, configured to output the image data of the object.

Further, the control unit making the microscope auto-focus by adjusting the image distance includes: the control unit searching the image distance by controlling the focusing lens unit in the main body of the microscope to move to make the microscope auto-focus with a fixed work distance of the microscope.

Further, the control unit making the microscope auto-focus by adjusting the image distance includes: the control unit changing the image distance by controlling the focusing lens unit in the main body of the microscope to move to make the microscope auto-focus with a changeable work distance of the microscope.

Further, the control unit includes:

an image data processing unit configured to receive and process the image signals obtained by the sensor board, and output the processed image data into an focus value calculating unit;

the focus value calculating unit configured to process the image data, calculate the focus value corresponding to the image data and input the focus value into a focus algorithm unit;

the focus algorithm unit configured to receive the position signal of the focusing lens unit sent by the lens-unit-position detecting unit and the focus value outputted by the focus value calculating unit, and execute the focus searching algorithm and obtain the best focus value by the focus searching algorithm, a motor control signal generated by the focus searching algorithm being sent to a motor control unit, the focusing lens unit moving to the position corresponding to the best focus value under the control of the focus searching algorithm;

the motor control unit configured to convert the motor control signal from the focus algorithm unit into a driving signal of a motor driving circuit and send the driving signal to a focus motor driving circuit;

the focus motor driving circuit configured to driving the focus motor according to the driving signal of the motor control signal to make the focusing lens unit move to the position corresponding to the best focus value.

Further, the focus algorithm unit includes:

a raw focus algorithm sub unit, configured to search a range corresponding to the best focus value using an adaptive step which is larger than a step used in a fine focus searching algorithm, and drive the focusing lens unit by controlling the motor control unit into the range corresponding to the best focus value;

a fine focus algorithm sub unit, configured to search the position corresponding to the best focus value in the range determined by the raw focus searching algorithm using a fixed step and drive the focusing lens unit by controlling the motor control unit to the position corresponding to the best focus value.

Further, the image data processing unit is configured to divide the image data into a number of sub areas;

the focus value calculating unit is configured specifically to process the image data of each sub area and obtain a high-frequency component focus value and a low-frequency component focus value corresponding to each sub area;

the focus algorithm unit further includes:

a focus value selection unit, configured to analyze the high-frequency component focus values and the low-frequency component focus values corresponding to each sub area by a preset focus value selection algorithm and determine whether the high-frequency component focus value or the low-frequency component focus value is selected to perform the focus searching to determine the best focus value.

Further, the lens module further includes a zooming lens unit and a zoom motor, the zoom motor configured to drive the zooming lens unit to move under the control of the control unit;

the lens-unit-position detecting unit is further configured to detect the position of the zooming lens unit and send the position information of the zooming lens unit to the control unit;

the control unit is configured to change the image distance by controlling a lens unit in the main body of the microscope to move to make the microscope auto-focus with a changeable work distance of the microscope in a continuous zooming process, which achieves making the microscope auto-focus by adjusting the image distance, the lens unit including the focusing lens unit and the zooming lens unit.

Further, the control unit is further configured to receive an outer zooming control signal through the interface unit, and be triggered by the outer zooming control signal to drive the zoom motor by executing a zoom tracking algorithm to control the movement of the zooming lens unit to make the microscope zoom;

the control unit further includes:

a human-computer interaction unit configured to receive the outer zooming control signal through the interface unit;

a zoom algorithm unit to receive the position information of the zooming lens unit and the focusing lens unit sent by the lens-unit-position detecting unit and the zooming control signal, and execute the zoom tracking algorithm, the motor control signal generated by the zoom tracking algorithm being sent to the motor control unit to make the zooming lens unit and the focusing lens unit move under the control of the zoom tracking algorithm to achieve zooming;

a zoom motor driving circuit configured to drive the zoom motor according to the driving signal of the motor control unit to make the zoom motor drive the movement of the zooming lens unit;

the motor control unit is further configured to convert the motor control signal outputted by the zoom algorithm unit into the driving signal of the motor driving circuit and output the driving signal to the zoom motor driving circuit.

Further, the control unit includes:

an exposure algorithm unit configured to calculate the image brightness information according to the image data outputted by the image data processing unit, and compare the calculated image brightness information to the preset image brightness information to calculate the brightness adjustment information of the light source;

a brightness control unit configured to output a brightness control signal to a brightness adjusting circuit according to the brightness adjustment information of the light source;

the brightness adjusting circuit configured to adjust power outputted to an assist light source according to the brightness control signal to adjust the brightness of the assist light source;

the main body of the microscope further includes the assist light source which is at a side of the lens module of the microscope facing the object.

Further, the interface unit is further configured to receive an outer brightness adjusting signal and send the outer brightness adjusting signal to the control unit;

the control unit is further configured to achieve manual adjustment of the brightness of the assist light source according to the outer brightness adjusting signal.

Compared with the conventional auto-focusing microscope, following are the advantages of the present disclosure.

A. compared with the way of the conventional microscope achieving auto-focusing by moving the stage, the present disclosure integrates the focusing lens unit and related control circuits into the internal of the microscope. The control unit in the microscope controls the focusing lens unit in the microscope to move to make the microscope auto-focus by changing the image distance and it does not need to move the stage and the microscope to achieve auto-focus. This improves the focusing efficiency and shortens the focusing time greatly.

B. compared with the fixed work distance of the conventional microscope, the present disclosure sets the focusing lens unit in the microscope and drives the focusing lens unit to move by the control unit. In this way, a changeable work distance is achieved. The correct focus can be achieved no matter how high the object is and it is no need to preset the height of the stage.

C. compared with the unable-to-auto-focus conventional microscope, in the zooming process of the microscope of the present disclosure, the control unit controls the movement of the zooming lens unit and the focusing lens unit according to the zoom tracking algorithm to achieve auto-focus in the zooming process.

D. compared with the conventional microscope needing to manually focus before zooming and then achieve the zooming operation, the microscope of the present disclosure does not need to manually focus. Instead, the control unit in the microscope controls the focusing lens unit to move to achieve auto-focus under the current magnification. Further, the present disclosure can achieve continuous zooming and tracking by the zoom tracking algorithm and the image is kept clear in the zooming process.

F. compared with the conventional microscope doing not consider that the change of the amount of light transmission of the microscope causes overexposure or light lack of the object, the control unit in the microscope of the present disclosure executes the exposure algorithm and adjusts the brightness of the assist light source at the front end of the microscope according to the change of the amount of light transmission to ensure uniform exposure and a good lighting effect.

DETAILED DESCRIPTION

Following are detailed descriptions for embodiments of the present disclosure with reference to the accompanying drawings.

Embodiment One

To the first technical problem which the present disclosure solves, the present disclosure provides an embodiment as following.

Figure 1:
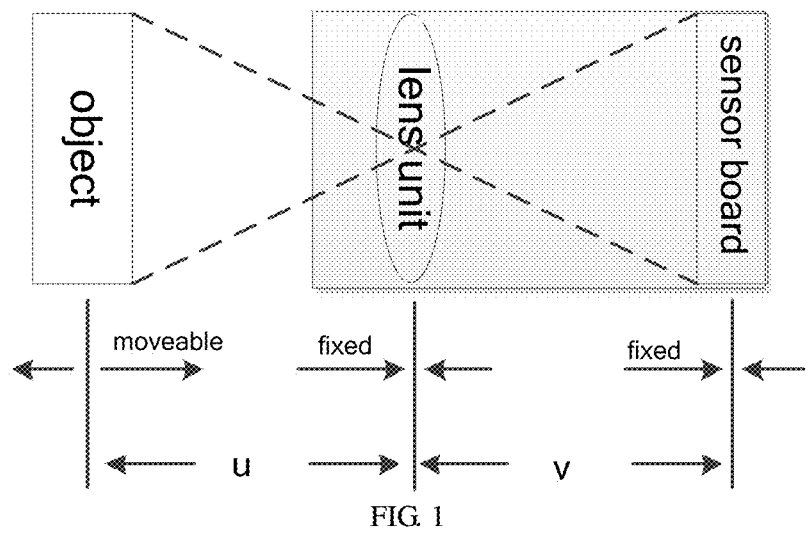
FIG. 1 is an auto-focusing process of a conventional microscope.
Figure 2:
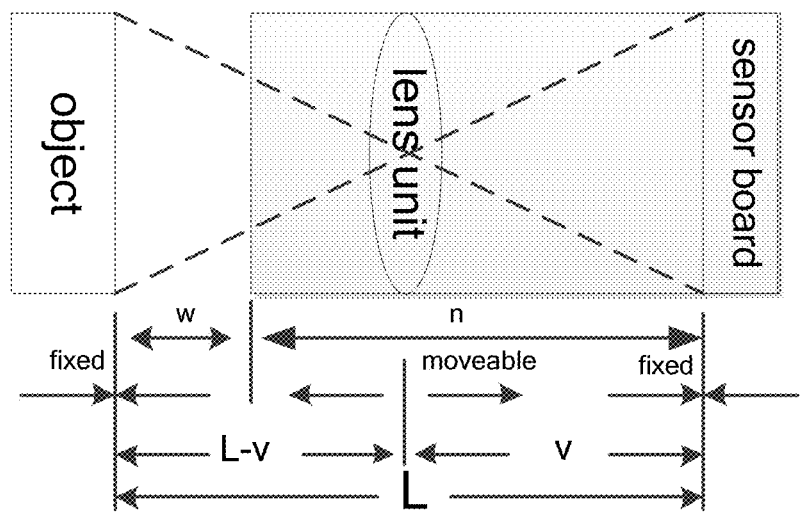
FIG. 2 is an auto-focusing optical principle schematic view with a fixed work distance, according to an embodiment of the present disclosure.

As shown in FIG. 1, in the conventional microscope, because the image distance v is fixed and the focal length f is fixed, the object distance u is also fixed according to the following formula 1. Focusing is achieved by moving the stage to search the object distance u. Differences between the embodiment and the conventional microscope are that, auto-focusing is achieved by a control unit in the microscope controlling the focusing lens unit in the microscope to move to search a proper image distance v with the fixed work distance. Please referring to FIG. 2, this makes the optical imaging formula changes from the conventional $$\frac{1}{f} = \frac{1}{u} + \frac{1}{v} \qquad \text{formula 1}$$

into $$\frac{1}{f} = \frac{1}{L-v} + \frac{1}{v}, \qquad \text{formula 2}$$

Where L is conjugate distance, and L=u+v=w+n, w is the work distance, n (constant) is the distance between the front end-surface of the microscope to the imaging surface. Therefore, the following formula can be learned from the formula 2:

$$\frac{1}{f} = \frac{1}{w+n-v} + \frac{1}{v} \qquad \text{formula 3}$$

Because the work distance w is fixed and n is a constant, the image distance v has the only value according to the formula 3. The auto-focusing method disclosed by the embodiment achieves auto-focusing of the object by moving the focusing lens unit in the microscope to search the proper image distance v. In the present disclosure, the control unit of the microscope system analyzes the image data and executes the focus searching algorithm and controls the focus motor by executing the focus searching algorithm to drive the focusing lens unit, and obtains different focus values during the movement of the focusing lens unit and obtains the position of the focusing lens unit corresponding to the best focus value by analyzing the different focus values.

Figure 5:
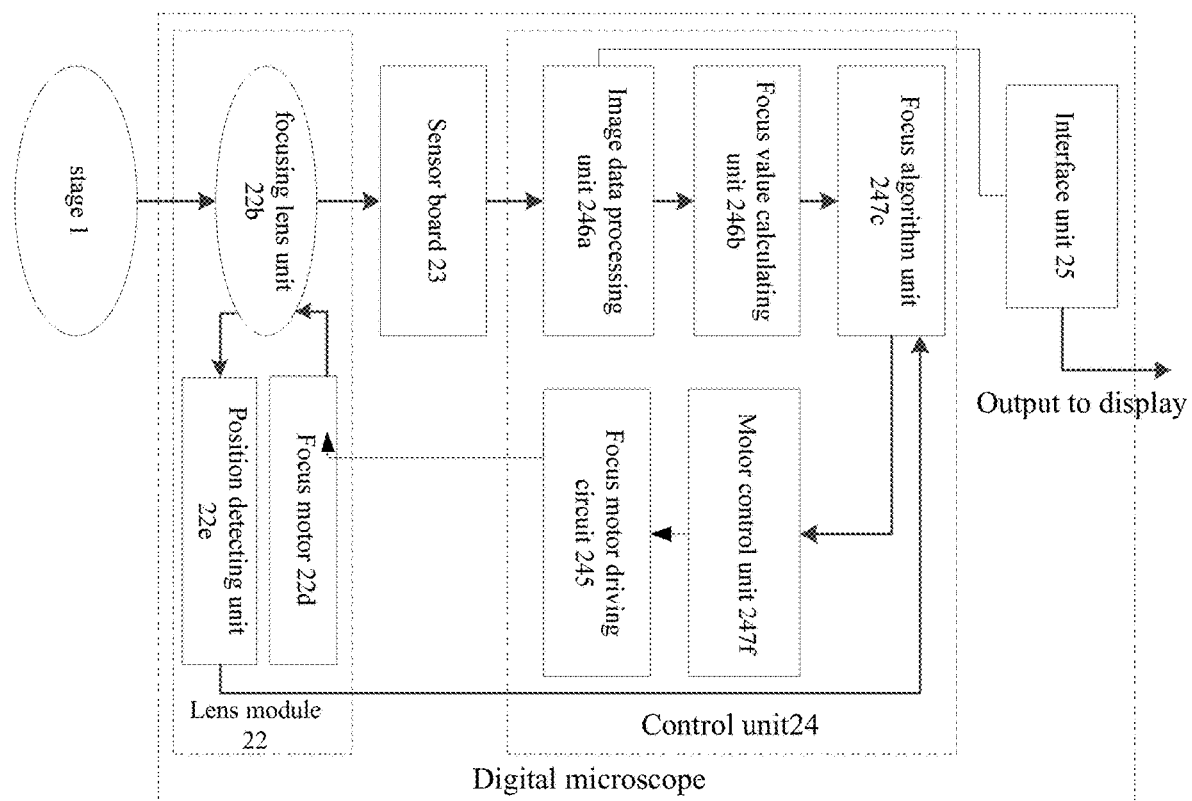
FIG. 5 is a schematic view of a digital microscope which can achieve auto-focus with a fixed work distance, according to an embodiment of the present disclosure.

FIG. 5 is a functional block diagram of an auto-focusing digital microscope according to the embodiment of the present disclosure. In this embodiment, the object is placed on the stage 1. The stage 1 and the digital microscope are fixed (the goal is to fix the work distance w). The digital microscope include a lens module 22, a sensor board 23 (imaging board), and a control unit 24 and an interface unit 25.

The lens module 22 includes a focusing lens unit 22b, a focus motor 22d and a lens-unit-position detecting unit 22e. The lens-unit-position detecting unit 22e is configured to detect the position of the focusing lens unit 22b and send the position of the focusing lens unit 22b to the control unit 24. The focus motor 22d receives the focus motor control signal sent by the control unit 24. The focus motor 22d drives the focusing lens unit 22b to move according to the received control signal, which makes the focusing lens unit 22b move to the position corresponding to the best focus value. The lens module 22 sends the optical signal which goes through the focusing lens unit to the sensor board.

The sensor board 23 is configured to convert the optical signal sent by the lens module 22 into image signals and input the image signals into the control unit 24.

The control unit 24 includes an image data processing unit 246a, a focus value calculating unit 246b, a focus algorithm unit 247c, a motor control unit 247f and a focus motor driving circuit 245. The sensor board 23 sends the image signals to the control unit 24. The control unit 24 inputs the processed image data and the focus motor control signal into the interface unit 25 and the lens module 22, respectively.

The interface unit 25 is configured to receives the image data which the control unit 24 outputs and is connected to a display device.

The control unit 24 includes:

the image data processing unit 246a configured to receive and process the image signals obtained by the sensor board 23, and input the processed image data into the focus value calculating unit 246b;

the focus value calculating unit 246b configured to process the image data processed by the image data processing unit 246a, and calculate the focus value corresponding to the image data and input the focus value into the focus algorithm unit 247c;

the focus algorithm unit 247c configured to receive the position signal of the focusing lens unit 22b sent by the lens-unit-position detecting unit 22e and the focus value outputted by the focus value calculating unit 246b and obtain the best focus value by executing the focus searching algorithm, the motor control signal generated by the focus algorithm unit 247c being sent to the motor control unit 247f;

the motor control unit 247f configured to convert the motor control signal from the focus algorithm unit 247c into a driving signal and send the driving signal to the focus motor driving circuit 245;

the focus motor driving circuit 245 configured to convert the driving signal into a focus motor control signal and send the focus motor control signal to the lens module 22.

In the control unit 24, when processing the image signal inputted by the sensor, the image data processing unit 246a divides the image signal into a number of sub areas and inputs the sub areas into the focus value calculating unit 246b. The focus value calculating unit 246b processes each of the sub areas respectively and obtains a high-frequency component focus value and a low-frequency component focus value corresponding to each sub area.

The focus algorithm unit 247c includes:

a raw focus algorithm sub unit configured to use a raw focus searching algorithm to search a range corresponding to the best focus value using an adaptive step which is larger than a step used in a fine focus searching algorithm, and send the focus motor control signal to the focus motor 22d to make the focus motor 22d drive the focusing lens unit 22b into the range corresponding to the best focus value;

a fine focus algorithm sub unit configured to use the fine focus searching algorithm to search the position corresponding to the best focus value in the range obtained by the raw focus algorithm sub unit using a fixed step and send the focus motor control signal to the focus motor 22d to make the focus motor 22d drive the focusing lens unit 22b into the position corresponding to the best focus value.

The focus algorithm unit 247c further includes:

a focus value selection unit configured to analyze the high-frequency component focus values and the low-frequency component focus values corresponding to each sub area by a preset focus value selection algorithm and determine whether the high-frequency component focus value or the low-frequency component focus value is used as a searching-algorithm focus value to perform the focus searching to determine the proper focus value.

The focus algorithm unit 247c sends the motor driving signal to the motor control unit 247f according to the selected searching-algorithm focus value and the position signal sent by the lens-unit-position detecting unit 22e. The motor control unit 247f sends the driving signal to the focus motor driving circuit 245. After receiving the driving signal, the focus motor driving circuit 245 sends the control signal to the focus motor 22d. The focus motor 22d controls the focusing lens unit 22b to move to a new detection position according to a step set by the searching algorithm. The lens-unit-position detecting unit 22e searches the position where the focusing lens unit 22b is corresponding to the best focus value by reciprocating movements of the focusing lens unit 22b. When the focus algorithm unit 247c determines to find the best focus value, the focus motor 22d drives the focusing lens unit 22b to move to the position corresponding to the best focus value by signal transmission, thereby achieving focusing. In the focusing process, the position corresponding to the best focus value is found by movement of the focusing lens unit 22b driven by the focus motor 22d to achieve auto-focus, instead of controlling movement of the stage 1.

Based on the digital microscope provided by the embodiment, the solution to the first technical problem is that, the control unit 24 in the microscope controls the lens module 22 of the microscope to change the image distance, which makes the microscope auto-focus. Specifically, the control unit 24 of the microscope executes the focus searching algorithm and obtains the best focus value through the focus searching algorithm. The control unit 24 sends the driving signal to the lens module 22 in the microscope. The focus motor 22d in the lens module 22 receives the driving signal sent by the control unit 24 and controls the focusing lens unit 22b in the lens module 22 to move to the position corresponding to the best focus value.

Figure 9:
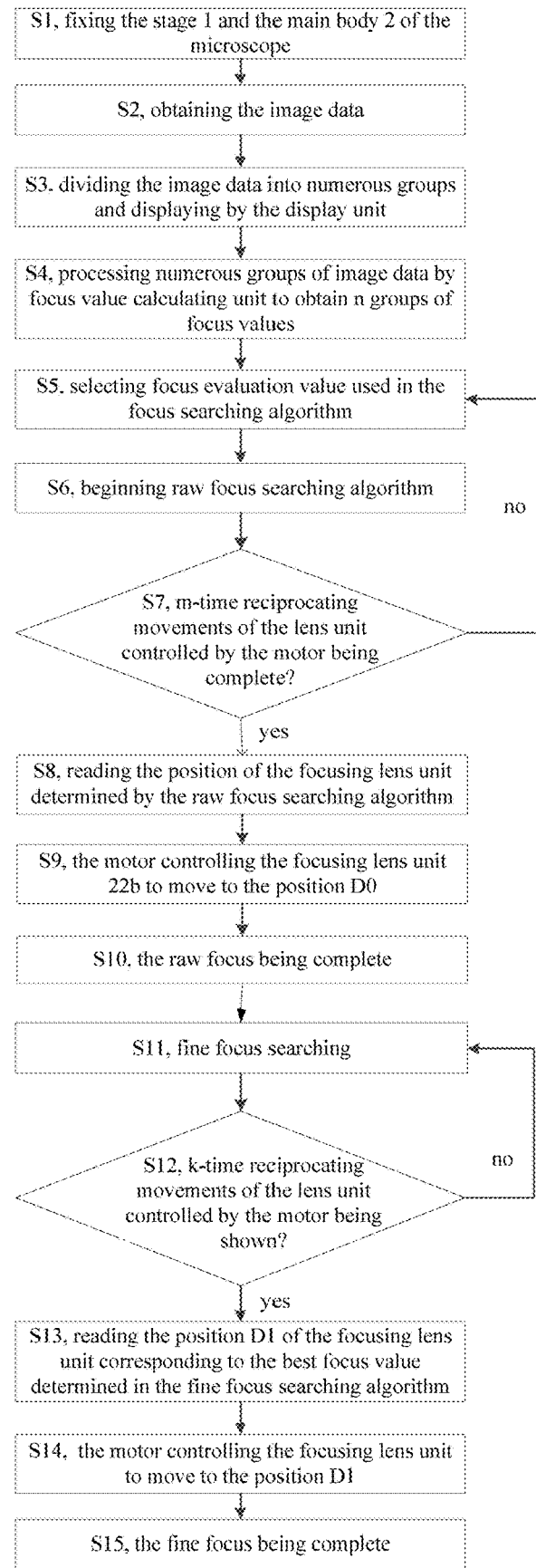
FIG. 9 is a flow chart of an auto-focusing method with a fixed work distance, according to an embodiment of the present disclosure.

FIG. 9 shows a method of the digital microscope achieving auto-focus with a fixed work distance. The method obtains groups of image data by the image data processing unit 246a processing original images formed by imaging the object through the focusing lens unit 22b in real time. Groups of focus values are obtained after the groups of image data processed by the focus value calculating unit 246b. The focus algorithm unit 247c selects a proper value as a focus evaluation value. In two stages of the raw focusing and the fine focusing, different steps are used to control the focusing speed and accuracy of the motor in different stages. In the raw focusing stage, a big step is used for fast focusing by analyzing the focus value to find a range corresponding to the best focus value. The focusing lens unit 22b is driven into a reference position in the range. In the fine focusing stage, a small step is used in the searching algorithm to find the clearest point, i.e., to find the position corresponding to the best focus value.

Following are detailed steps.

Step S1: preparation before turning on the digital microscope is that the object is placed on the stage 1, and the stage 1 and the main body 2 of the microscope are fixed (in order to fix the work distance) and the display 4 is connected.

Step S2: the image data is obtained by the sensor board 23 imaging the object through the focusing lens unit 22b in real time.

Step S3: the original image data obtained from the sensor board 23 is outputted to the image data processing unit 246a, and the image data processing unit 246a directly outputs the original image data to the interface unit 25 to display outside. Meanwhile, the image data processing unit 246a divides the original image data into n sub areas according to the preset image data processing algorithm and sends the n sub areas to the focus value calculating unit 246b.

Step S4: the focus value calculating unit 246b calculates the focus values corresponding to the n sub areas and obtains n groups of high-frequency component focus value and low-frequency component focus value.

Step S5: the n groups of high-frequency component focus value and low-frequency component focus value are analyzed by the preset focus value selection algorithm. Whether the high-frequency component focus value or the low-frequency component focus value is used as the focus value in the searching algorithm is determined to perform focus searching to determine the best focus value.

The specific method follows. If one of n groups of the high-frequency component focus value is greater than or equal to a preset threshold T, then the group of the greatest high-frequency component focus value in the n groups of the high-frequency component focus value is used as the focus evaluation value in the focus searching. If all of n groups of the high-frequency component focus value are smaller than the preset threshold T, then the group of the greatest low-frequency component focus value in the n groups of the low-frequency component focus value is used as the focus evaluation value in the focus searching. The focus evaluation value is used for determining the range corresponding to the best focus value.

Step S6: the raw focus searching algorithm searches with an adaptive step according to the focus evaluation value.

The focus searching includes two processes of a raw focus searching and a fine focus searching.

The raw focus searching process uses the adaptive step which is greater than the step used in the fine focus searching process. The raw focus searching algorithm searches a range corresponding to the best focus value and sends the driving signal to the lens module 22 to achieve the movement of the focusing lens unit 22b in the lens module 22, which makes the focusing lens unit 22b move into the range corresponding to the best focus value.

The fine focus searching process uses the fixed step. After the raw focusing is complete, the fine focus searching process searches the position of the focusing lens unit 22b corresponding to the best value in the range corresponding to the best focus value, and sends the driving signal to the lens module 22 to achieve the movement of the focusing lens unit 22b in the lens module 22, which makes the focusing lens unit 22b move into the position corresponding to the best focus value.

Step S7: when executing the raw focus searching algorithm, the control unit 24 sends the driving signal to the focus motor 22d to make the focus motor 22d control m-time reciprocating movements of the focusing lens unit 22b to find the range corresponding to the best focus value. If m-time reciprocating movements are complete, then go to step S8, otherwise go to step S5.

Step S8: one position D0 in the range corresponding to the best focus value and determined when executing the raw focus searching algorithm is read.

Step S9: the control unit 24 sends the driving signal to the focus motor 22d. The focus motor 22d receives the driving signal and controls the focusing lens unit 22b to move to the position D0.

Step S10: the raw focus searching process is complete and the fine focus searching begins.

Step S11: the fine focus searching algorithm is executed with a fixed step in the fine focus searching process according to the focus evaluation value selected in the step S5.

Step S12: in the fine focus searching algorithm, the control unit 24 sends the driving signal to the focus motor 22d. The focus motor 22d receives the driving signal and controls k-time reciprocating movements of the focusing lens unit 22b to find the position D1 corresponding to the best focus value. If k-time reciprocating movements are complete, then go to step S13, otherwise go to step S11.

Step S13: the position D1 of the focusing lens unit 22b is read when obtaining the best focus value in the fine focus searching process.

Step S14: the control unit 24 sends the driving signal to the focus motor 22d. The focus motor 22d receives the driving signal and controls the focusing lens unit 22b to move to the position D1.

Step S15: the find focus searching process is complete. Thus, the auto-focusing process of the digital microscope is complete.

Figure 11:
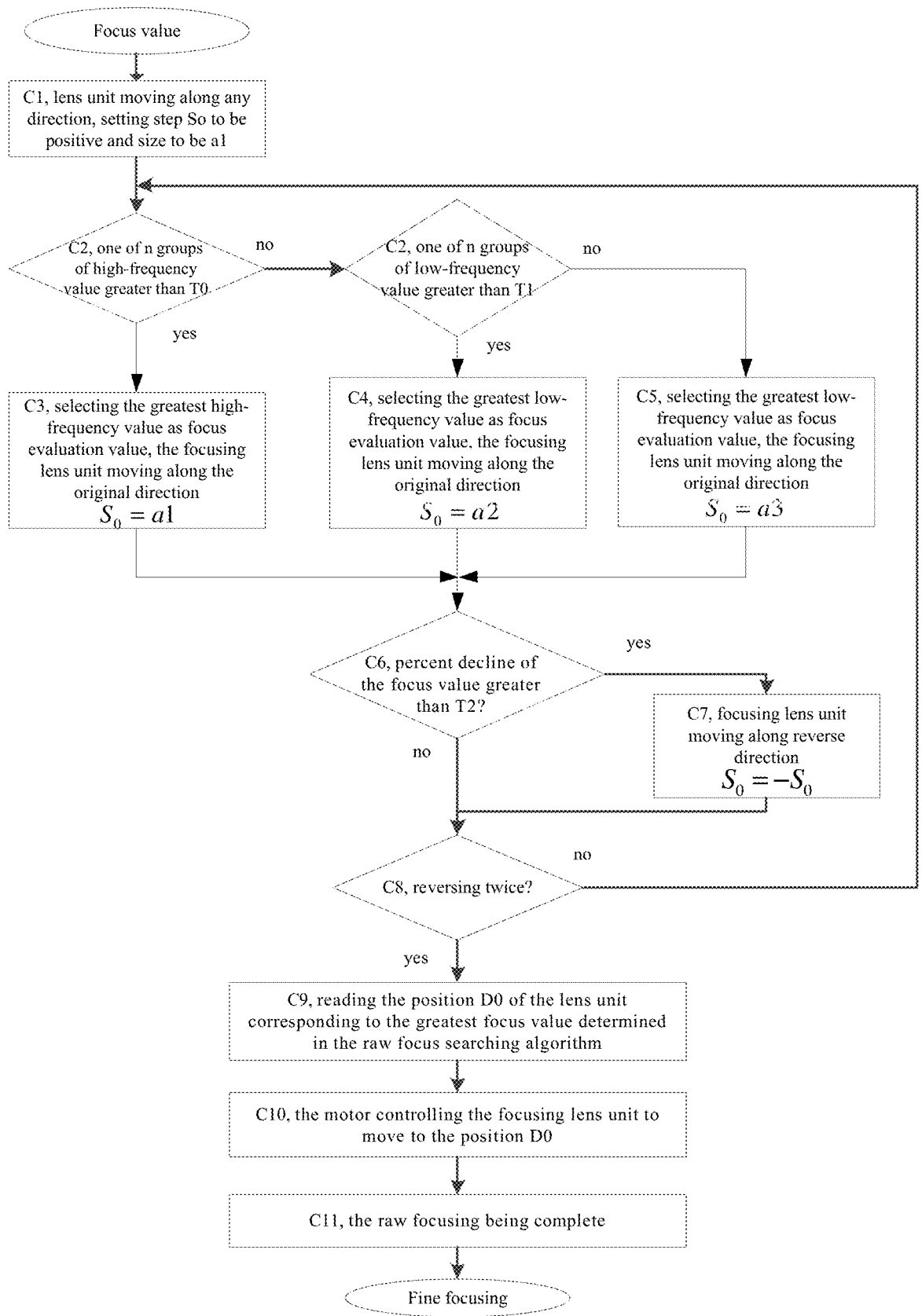
FIG. 11 is a flow chart of a raw focus searching algorithm of the focus searching algorithm, according to an embodiment of the present disclosure.

In the embodiment one, the flow chart of the raw focus searching process with the adaptive step is shown in FIG. 11. The searching step $S_0$ is a moving distance which the focus motor 22d controls the focusing lens unit 22b to move each time. Value of the step influences timeliness and correctness of the algorithm. A too-small step would influence the focusing time of the algorithm and a too-big step would cause jump-off-the-top phenomenon and this will cause incorrect focusing. The percent decline T2 of the focus value is used for determining the moving direction of the focusing lens unit 22b under control of the focus motor 22d in the digital microscope.

Figure 10:
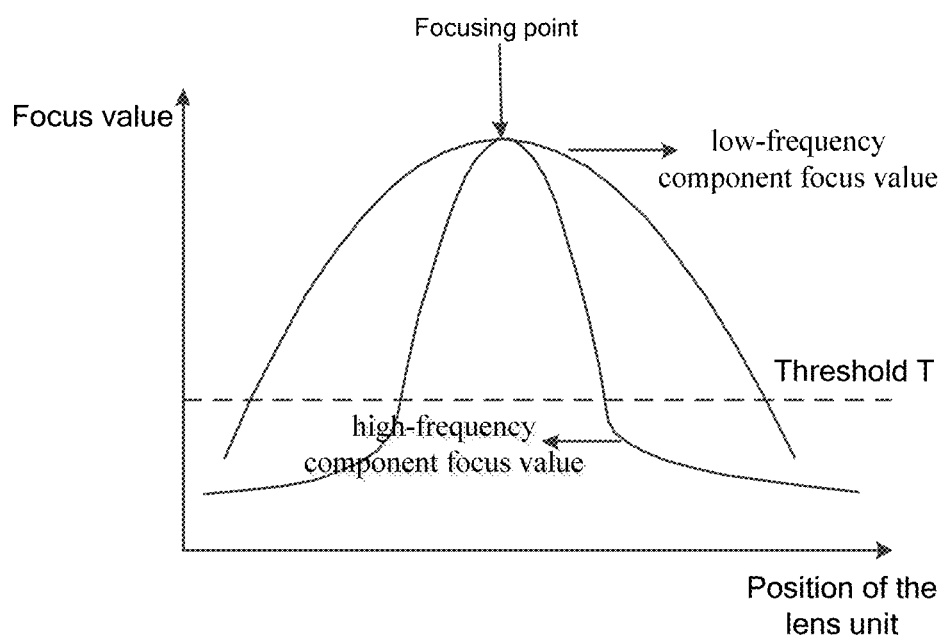
FIG. 10 is a diagram showing relationships between the focus value and the position of the lens unit, according to an embodiment of the present disclosure.

Threshold T0 is used for determining whether the high-frequency component focus value or the low-frequency component focus value is used as the focus value in the focus searching algorithm. It can be learned from the diagram in FIG. 10 that, to ensure the focusing timeliness and correctness, a proper threshold must be set to make that when the object is a dark object, the low-frequency component can be used to focus correctly and when the object is a highlight object, the high-frequency component can be used to focus correctly. The specific solution for selecting the focus evaluation value can be referred to step S5 in the embodiment of the auto-focusing method with a fixed work distance.

Thresholds T0, T1 are used for determining size of the moving step of the focusing lens unit 22b under control the focus motor 22d. When the image is at the far-focus position, the focus motor 22d controls the focusing lens unit 22b to move with a large step. When the image is at the near-focus position, the focus motor 22d controls the focusing lens unit 22b to move with a smaller step.

Before the raw focus searching begins, it needs to obtain the n groups of the high-frequency component focus value and the low-frequency component focus value according to step S4 in the embodiment one. After that, the raw focus searching steps begin as following:

step C1: starting the raw focus algorithm, and initially, the focus motor controlling the focusing lens unit to move along one direction with step $|S_0|=a1$, and recording positions of the focusing lens unit and data of each image frame;

step C2: if an group of values in a plurality of groups of the high-frequency component focus values is greater than threshold T0, then going to step C3; if an group of values in a plurality of groups of the low-frequency component focus values is greater than threshold T1, then going to step C4, otherwise going to step C5;

step C3: selecting the greatest high-frequency component focus value as a focus evaluation value and setting $S_0$=a1, the focusing lens unit moving along an original direction with S0, and going to step C6;

step C4: selecting the greatest focus value as the focus evaluation value and setting $S_0$=a2, the focusing lens unit moving along the original direction with S0, and going to step C6;

step C5: selecting the greatest low-frequency component focus value as the focus evaluation value and setting $S_0$=a3, the focusing lens unit moving along the original direction with S0, and going to step C6;

step C6: if percent decline of the focus value is greater than threshold T2, then going to step C7, otherwise going to step C8;

step C7: the focusing lens unit moving along a reverse direction with step S0, i.e., setting $S_0$=$-S_0$ and going to step C8;

step C8: if the focusing lens unit finishes m-times reciprocating movements, then going to step C9, otherwise going to step C2;

step C9: reading the position D0 of the focusing lens unit when obtaining a range corresponding to the greatest focus value determined in the raw focus searching process, and determining a searching range for fine focusing to be [D0−$S_0$,D0+$S_0$];

step C10: the focus motor controlling the focusing lens unit to move to the position D0;

step C11: the raw focusing being complete, going to the fine focus searching algorithm.

Figure 12:
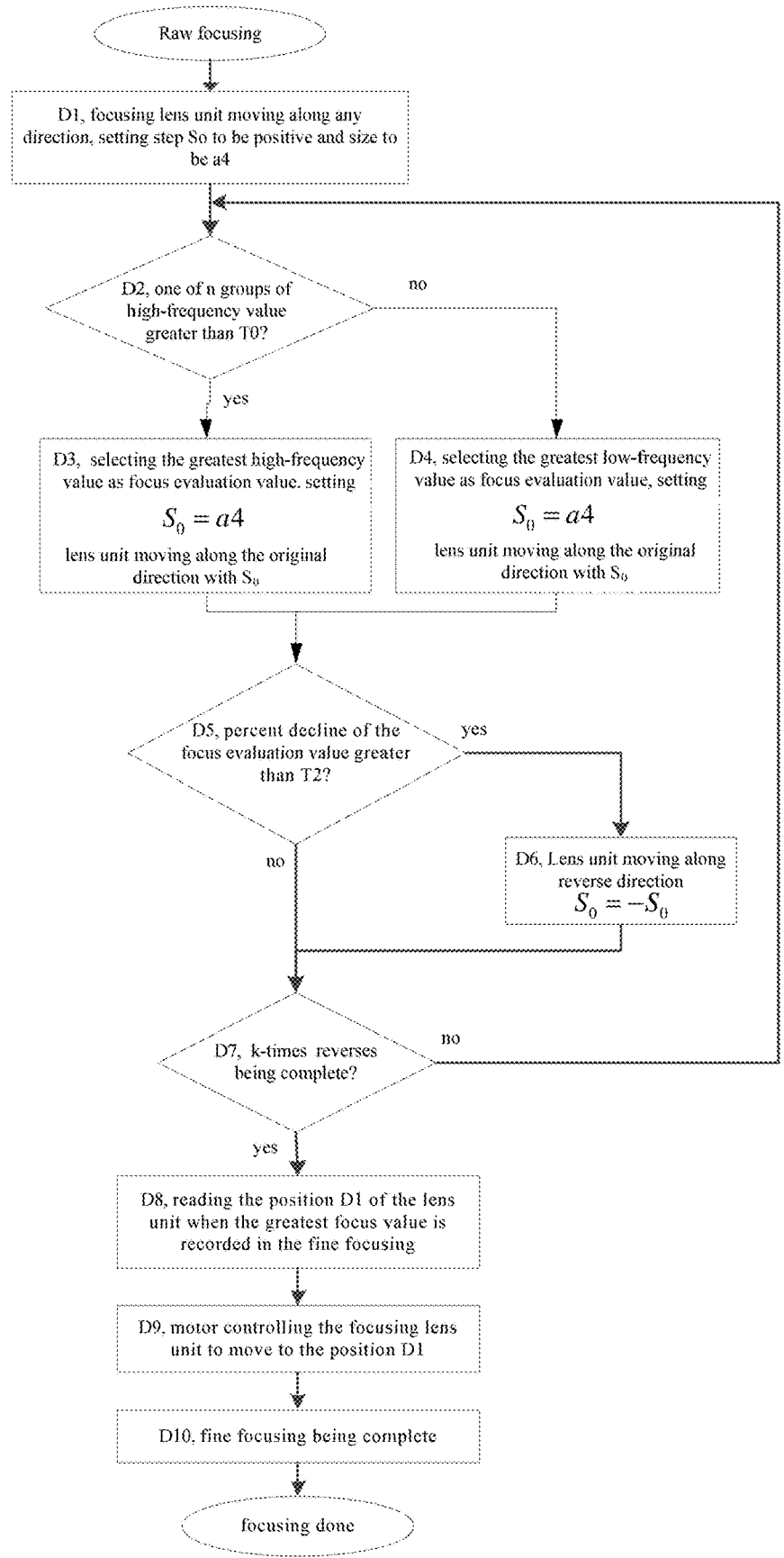
FIG. 12 is a flow chart of a fine focus searching algorithm of the focus searching algorithm, according to an embodiment of the present disclosure.

The digital microscope of the present disclosure obtains the n groups of the high-frequency component focus value and the low-frequency component focus value according to step S4 in the embodiment one, and the fine focus searching steps begin. As shown in FIG. 12, the fine focus searching process includes:

step D1: starting the fine focus searching, and initially, the focus motor controlling the focusing lens unit to move along one direction with step $|S_0|=a4$, and recording positions of the focusing lens unit and data of each image frame;

step D2: if an group of values in a plurality of groups of the high-frequency component focus values is greater than threshold T0, then going to step D3, otherwise going to step D4;

step D3: selecting the group of the greatest high-frequency component focus value as the focus evaluation value and setting $S_0=a4$, the focusing lens unit moving along an original direction with S0, and going to step D4;

step D4: selecting the group of the greatest low-frequency component focus value as the focus evaluation value and setting $S_0=a4$, the focusing lens unit moving along the original direction with S0;

step D5: if percent decline of the focus value is greater than threshold T2 or the position of the focusing lens unit being beyond the searching range $[D0-S_0, D0+S_0]$ for the fine focusing, then going to step D6, otherwise going to step D7;

step D6: setting $S_0=-S_0$, the focusing lens unit moving along a reverse direction with step S0, and going to step D7;

step D7: if the focusing lens unit finishes k-times reciprocating movements, then going to step D8, otherwise going to step D2;

step D8: reading the position D1 of the focusing lens unit when obtaining the greatest focus value in the fine focus searching process, and the position D1 determined in this step being the position of the focusing lens unit when obtaining the best focus value after completion of focus searching;

step D9: the focus motor controlling the focusing lens unit to move to the position D1;

step D10: the fine focusing being complete and the focusing being done.

In this embodiment, threshold T0=100000, threshold T1=2000000, threshold T3=0.2, a1=2, a2=8, a3=16, a4=1, n=5, m=2, k=2. In practical use, the values can change according to different scenarios, and the present disclosure is not limited to the above specific values.

Embodiment Two

To the second technical problem which the present disclosure solves, the present disclosure provides an embodiment as following.

In the conventional microscope, because the work distance is fixed, if the height of the object changes, it will cause an un-clear image. It needs to adjust the stage or the main body of the microscope again to image clearly. Further, movement of the stage is limited. When the object is too big, and size of the object is beyond a control range, it is not able to focus correctly no matter how the stage moves. Besides, because size of the object is unknown before, it often causes a long time to zoom or focus.

Figure 3:
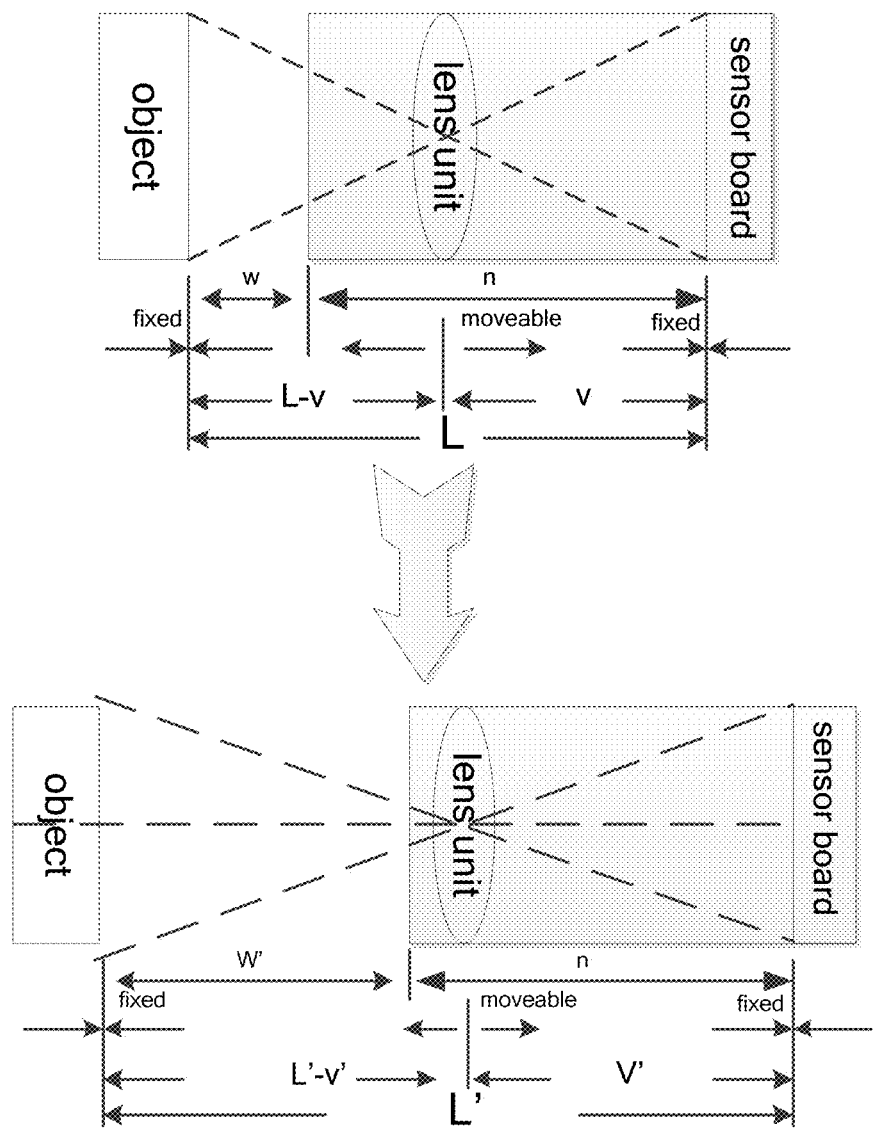
FIG. 3 is an auto-focusing optical principle schematic view with a changeable work distance, according to an embodiment of the present disclosure.
Figure 4:
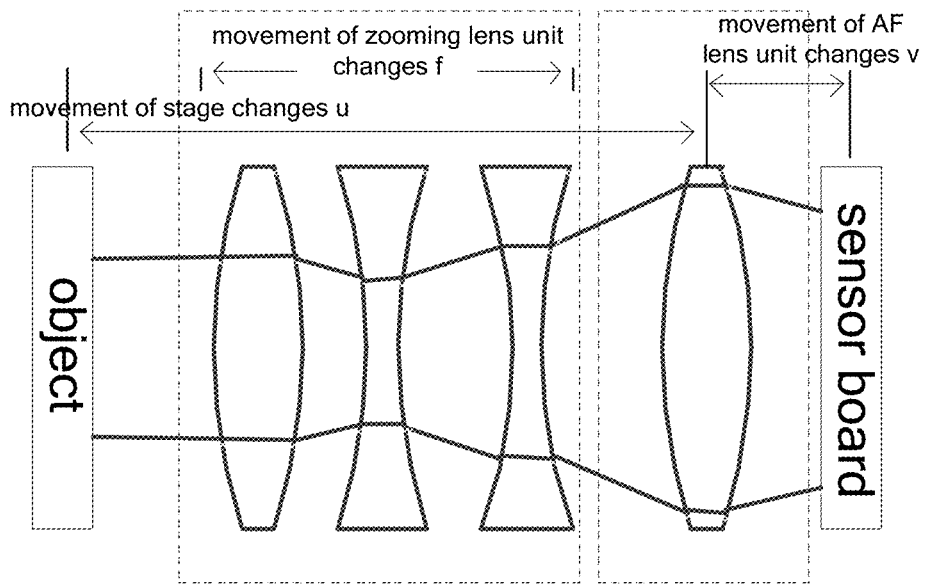
FIG. 4 is an auto-focusing optical principle schematic view with a changeable magnification and a changeable work distance, according to an embodiment of the present disclosure.

As shown in FIG. 3 and FIG. 4, the difference between this embodiment and the conventional microscope is that the work distance w is changeable. According to the optical imaging formula 3, f is fixed, the image distance v is changeable (from v to v'), and n is constant. Therefore, the work distance w is changeable (from w to w'). This means that the clear image can be achieved by the control unit in the digital microscope executing the focus searching algorithm to control the focusing lens unit to move automatically to change the image distance (from v to v') correspondingly no matter how the height of the object changes. It does not need to know the approximate position of the object previously when clearly imaging.

Similarly, according to the structure of the digital microscope provided by the embodiment one, the operator can move the stage manually to change the work distance (from w to w'). After executing the focus searching algorithm, the control unit 24 in the digital microscope controls the movement of the focusing lens unit 22b automatically to change the image distance (from v to v'), thereby achieving auto-focus. It is noted that, the movement of the stage 1 is not for focusing and is for the user to change the work distance w according the size of the object, which makes the object have a proper size after imaging.

Embodiment Three

To the third technical problem which the present disclosure solves, the present disclosure provides an embodiment as following.

In the conventional microscope, because the work distance is fixed, to ensure the displayed image is always clear during the zooming process, it has to make sure that the focal length f and the image distance v change simultaneously according to the relation curve between the focal length f and the image distance v. However, because the conventional microscope is limited by the fixed work distance and the adjustment mechanism, clarity of the actual output image is influenced greatly.

Figure 6:
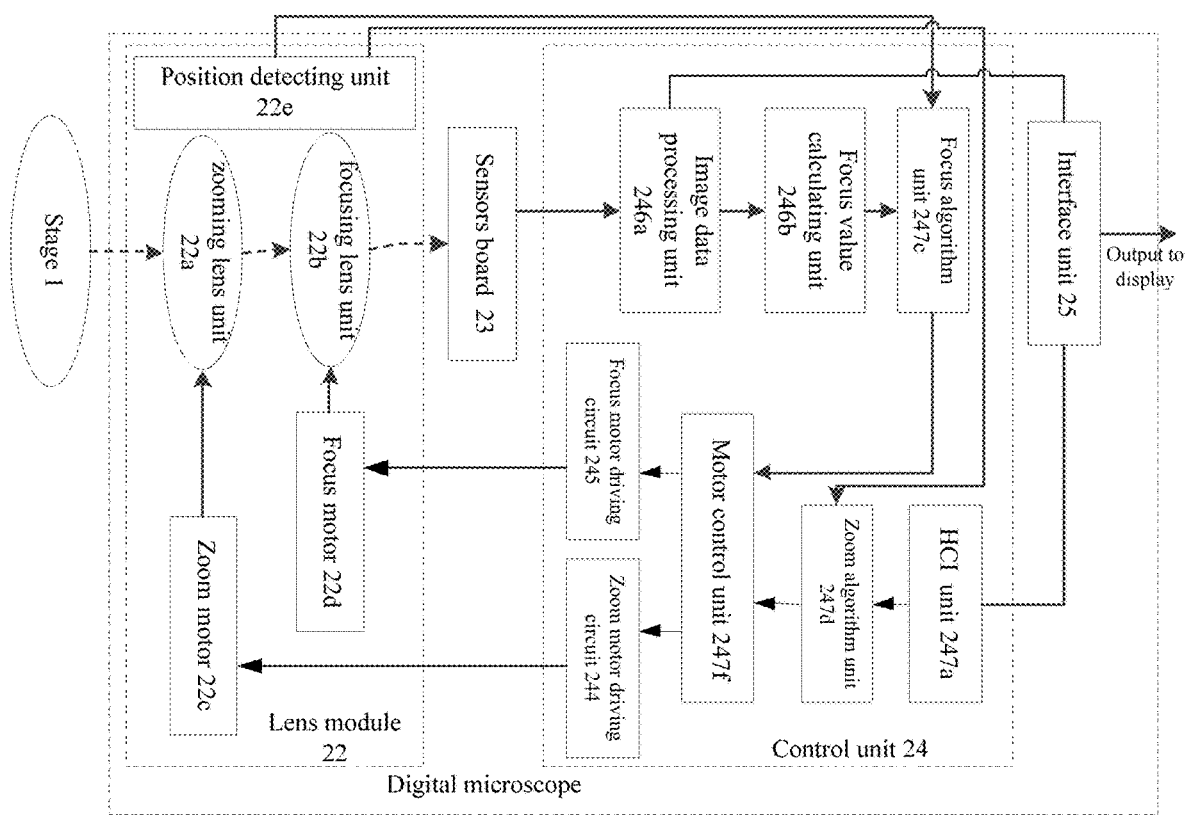
FIG. 6 is a schematic view of a digital microscope which can achieve auto-focus with a changeable magnification and a changeable work distance, according to an embodiment of the present disclosure.
Figure 13:
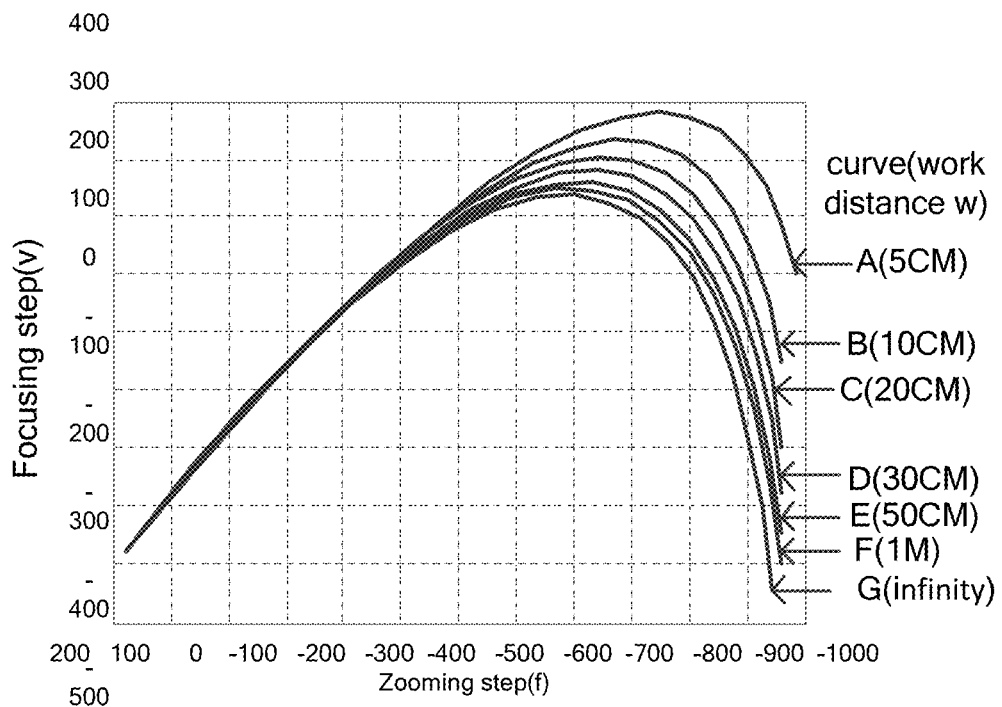
FIG. 13 is a diagram showing relationships between the focal length f, the image distance v and the work distance w, according to an embodiment of the present disclosure.

The differences between the embodiment of the present disclosure and the conventional microscope are that the work distance w is changeable, and the output image is always clear during the zooming process with any work distance. As shown in FIG. 6, in the zooming process, the control unit 24 sends the driving signal to the zoom motor 22c in the lens module 22 to control the zooming lens unit 22a and the focusing lens unit 22b to move simultaneously according to the relation curve between the focal length f, the image distance v and the work distance w as shown in FIG. 13, and keeps the image clear during the whole zooming process by adjusting the position of the focusing lens unit 22b in real time. The conventional microscope needs a cam mechanism to achieve focusing during the zooming process. Instead, the digital microscope in the embodiment achieves auto-focus by algorithm, which has a high accuracy, and achieves the zooming operation with any work distance. The structure of the digital microscope in the embodiment three is shown in FIG. 6. Based on the digital microscope in the embodiment one, the embodiment three adds the control unit and the zooming lens unit which achieves zooming in the microscope correspondingly. Following are detailed descriptions for the differences from the embodiment one. The same parts can be referred to the embodiment one, and detailed descriptions therefor are omitted.

The zooming lens unit 22a and the zoom motor 22c are added in the lens module 22 in the embodiment three. The zoom motor 22c is configured to receive the zoom driving signal sent by the control unit 24 and control the zooming lens unit 22a to move. Additionally, the lens-unit-position detecting unit 22e is further configured to detect the position of the zooming lens unit 22a and send the position of the zooming lens unit 22a to the zoom algorithm unit 247d.

Compared with the embodiment one, the control unit 24 in the embodiment three is further configured to receive the zooming control signal sent by the interface unit 25 and can be triggered by the outer zooming control signal to send the driving signal to the lens module 22 by executing the zoom tracking algorithm to control the zooming lens unit 22a and the focusing lens unit 22b to move, which achieves autofocus during the zooming process of the microscope by changing the image distance and the focal length.

Compared with the embodiment one, the control unit 24 further includes:

a human-computer interaction (HCI) unit 247a configured to receive the outer zooming control signal sent by the interface unit 25 and control the zoom algorithm unit 247a to execute the zoom tracking algorithm;

the zoom algorithm unit 247d configured to execute the zoom tracking algorithm and send the control signal to the motor control unit 247f to make the zooming lens unit 22a and the focusing lens unit 22b move during the execution process of the zoom tracking algorithm to achieve autofocus when zooming;

the zoom tracking algorithm being shown in FIG. 13 (relation curve between the focal length f, the image distance v and the work distance w), movement of the focusing lens unit and the zooming lens unit being controlled simultaneously during the zooming process and the position of the focusing lens unit 22b being adjusted in real time by the zoom tracking algorithm to keep the image clear in the whole zooming process, when the object being magnified to a suitable magnification, the zooming operation being stopped;

the motor control unit 247f further configured to convert the motor control signal outputted by the zoom algorithm unit 247f into the driving signal which the motor driving circuit needs and send the zoom driving signal to a zoom motor driving circuit 244;

the zoom motor driving circuit 244 configured to receive the zoom driving signal sent by the motor control unit 247f and send the driving signal to the zoom motor 22c to make the zoom motor 22c control the movement of the zooming lens unit 22a.

In the digital microscope of the embodiment three, first, the object is placed on the stage 1 and the stage 1 and the microscope are fixed (the goal is to fix the work distance w). The object is auto-focused by the auto-focusing method provided by the embodiment one or the embodiment two before zooming, which makes the image of the object clear.

In the embodiment three, the micro control key connected to the interface unit 25 sends the zoom control signal to the interface unit 25, or the outer control device or keyboard connected to the interface unit 25 sends the zoom control signal to the interface unit 25. The interface unit 25 sends the zoom control signal to the HCI unit 247a.

In the embodiment three, after zooming is complete, more accurate auto-focusing of the object can be achieved by the auto-focusing method provided by the embodiment one or the embodiment two to ensure that the object is imaged at the clearest position.

When solving the third technical problem in the present disclosure, the following zooming method is used according to the structure of the digital microscope provided in the embodiment three. In this method, the magnification and the work distance are changeable, and the zooming and the auto-focusing can be done simultaneously. This can achieve zoom tracking and clear imaging in the whole process. Different from the zooming way of the conventional microscope, the work distance w of the embodiment is changeable and zooming can be achieved with any work distance. The focus motor 22d and the zoom motor 22c control the movement of the zooming lens unit 22a and the focusing lens unit 22b by the control unit 24 sending the driving signal to the lens module 22. The zooming lens unit 22a and the focusing lens unit 22b move according to the relation curves shown in FIG. 13. The position of the focusing lens unit 22b is adjusted in real time by executing the focus tracking algorithm to keep the image clear in the whole zooming process. Following are detailed descriptions.

Figure 14:
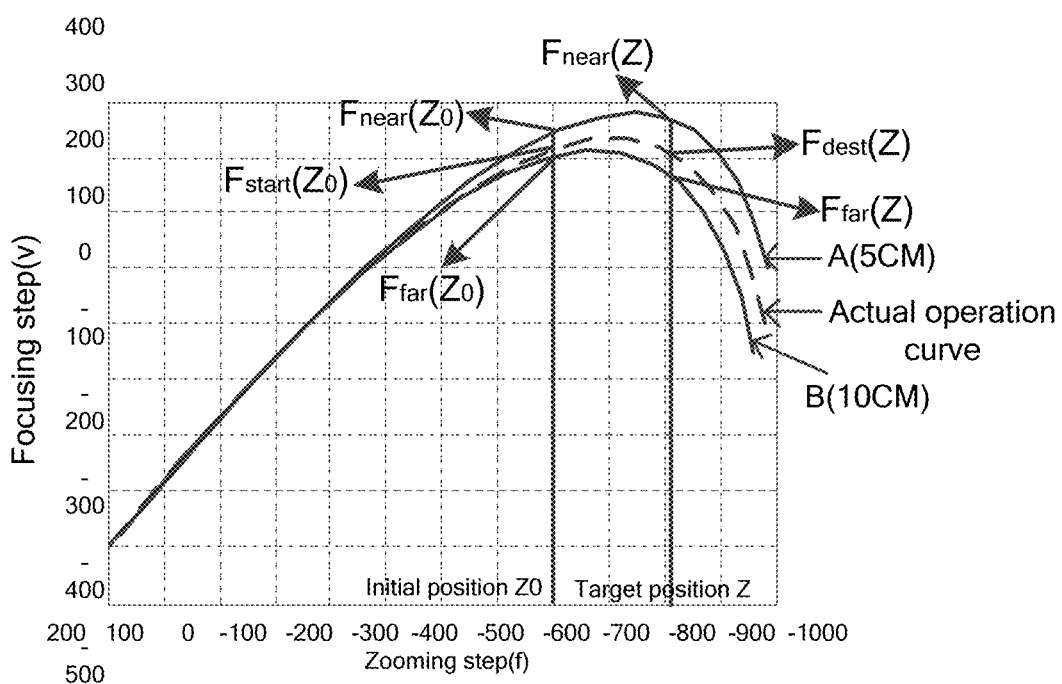
FIG. 14 is a diagram showing relationships between the actual zooming curve and the theoretical curve, according to an embodiment of the present disclosure.

First, the image-distance position of the focusing lens unit 22b is found when the object is imaged clearly according to the auto-focusing method in the embodiment one. The initial image-distance position $F_{start}(Z_0)$ and the focal length $Z_0$ of the focusing lens unit 22b are recorded. Two theoretical curves which are nearest the actual operation curve where $F_{start}(Z_0)$ is are regarded as the upper and lower boundary curves. The two theoretical curves are selected from the related theoretical curves (as shown in FIG. 13, there are 7 theoretical curves in the embodiment three) corresponding to the image distance v and the focal length Z with different pre-stored work distances according to the value of $F_{start}(Z_0)$ of the object. The upper boundary curve is marked as $F_{near}(Z)$ and the lower boundary curve is marked as $F_{far}(Z)$. The actual track of the focusing lens unit 22b and the zooming lens unit 22a are calculated automatically according to the following formula (4). The relationship between the actual zooming curve and the theoretical curve is shown in FIG. 14.

$$F_{dest}(Z) = \frac{F_{start}(Z_0) - F_{far}(Z_0)}{F_{near}(Z_0) - F_{far}(Z_0)} * (F_{near}(Z) - F_{far}(Z)) + F_{far}(Z). \quad \text{formula (4)}$$

$F_{dest}(Z)$ represents the position of the focusing lens unit 22b when the focal length is Z. $F_{start}(Z_0)$ represents the initial position of the focusing lens unit 22b moving along the actual operation curve when the focal length is $Z_0$. $F_{near}(Z_0)$ represents the upper boundary theoretical curve nearest the actual operation curve when the focal length is $Z_0$. $F_{near}(Z)$ represents the position of the focusing lens unit. $F_{far}(Z_0)$ represents the lower boundary theoretical curve nearest the actual operation curve when the focal length is $Z_0$. $F_{far}(Z)$ represents the position of the focusing lens unit. $F_{near}(Z)$ represents the position of the focusing lens unit on the upper boundary theoretical curve nearest the actual operation curve when the focal length Z. $F_{far}(Z)$ represents the position of the focusing lens unit on the lower boundary theoretical curve nearest the actual operation curve when the focal length Z.

Figure 8:
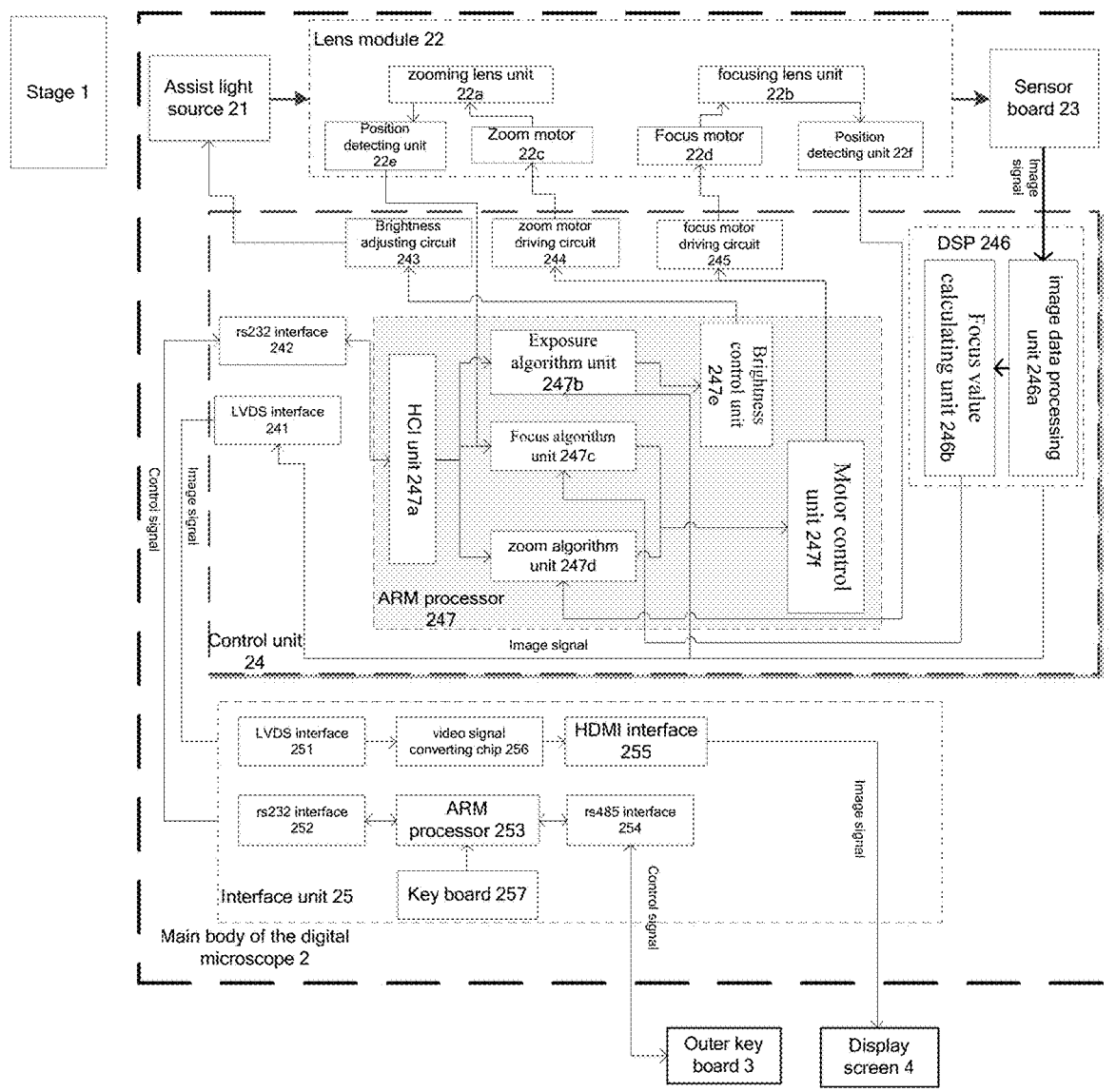
FIG. 8 is a schematic view of a digital microscope, according to an embodiment of the present disclosure.

In the structure of the digital microscope shown in the FIG. 8, the embodiment three provides an auto-focusing method where the magnification and the work distance are changeable. Following are specific steps.

Step E1: preparation before turning on the digital microscope is that the object is placed on the stage 1, and the stage 1 and the main body 2 of the microscope are fixed and the display 4 is connected.

If the work distance needs to be adjusted, then height of the stage 1 or the microscope 2 is adjusted manually.

Step E2: the auto-focusing of the object is achieved by the auto-focusing method provided by the embodiment one, which makes the object image clearly.

Step E3: the current image distance $F_{start}(Z_0)$ and the focal length $Z_0$ of the focusing lens unit 22b are recorded.

Step E4: the microscope is controlled to zoom by the key board 257 or the outer key board 3 connected to the interface unit 25.

Step E5: ARM processor 253 translates the user's key operation into orders which the microscope recognizes and sends the orders to the HCl unit 247*a* through the rs232 interface 252 and the rs232 interface 242.

Step E6: the HCl unit 247*a* controls the zoom algorithm unit 247*d* to execute the zoom tracking algorithm.

Step E7: the zoom algorithm unit 247*d* obtains the image distance $F_{dest}(Z)$ of the object when the focal length is z according to the formula (4).

Step E8: the zoom algorithm unit 247*d* sends the motor control signal to the motor control unit 247*f*. After receiving the motor control signal, the motor control unit 247*f* sends the driving signals to the zoom motor driving circuit 244 and the focus motor driving circuit 245. After receiving the driving signal, the zoom motor driving circuit 244 controls the zooming lens unit 22*a* to move to the position z. At the same time, after receiving the driving signal, the focus motor driving circuit 245 controls the focusing lens unit 22*b* to move to the position $F_{dest}(Z)$ and adjusts the position of the focusing lens unit 22*b* in real time by the algorithm to keep the image clear during the whole zooming process.

Step E9: after the zooming is complete, more accurate auto-focusing of the object can be achieved by the auto-focusing algorithm provided by the embodiment one.

Embodiment Four

To the fourth technical problem which the present disclosure solves, the present disclosure provides an embodiment as following.

The brightness of the light source in the conventional microscope is adjusted manually to increase the brightness of the object. In the actual application, when the environment and the magnification change, the amount of light through the lens module changes continuously. To ensure a proper auto-focusing, the brightness of the light source needs to be adjusted continuously until satisfactory effect. Under this situation, it is obviously impossible to adjust the brightness of the assist light source manually.

Figure 7:
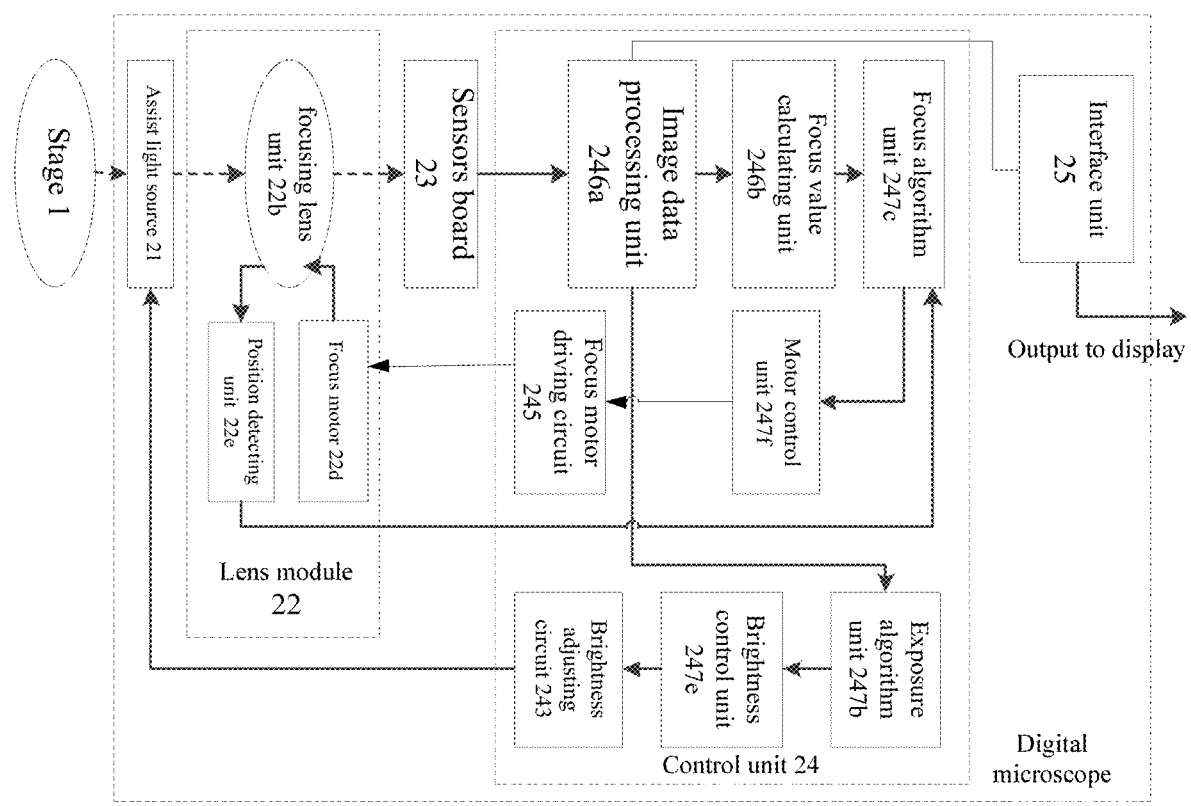
FIG. 7 is a schematic view showing auto-control of brightness of the light source, according to an embodiment of the present disclosure.

The digital microscope, shown in the FIG. 7, adds an assist light source 21 and related control circuits based on the structure of the digital microscope provided by the embodiment one. Similarly, the assist light source and the control circuit in the embodiment four can be combined with the embodiment one, the embodiment two and the embodiment three to achieve auto-adjustment of the brightness of the digital microscope. In the embodiment four, an exposure algorithm unit 247*b* executes image analysis according to the object and the magnification to adjust the brightness of the light source automatically, which keep the image effect best.

As shown in FIG. 7, following are detailed descriptions for the brightness adjustment. Detailed descriptions the same as those in the embodiment one, the embodiment two and the embodiment three are omitted. In the embodiment four, the control unit 24 further includes:

the exposure algorithm unit 247*b* configured to calculate the image brightness information according to the image data outputted by the image data processing unit 246*a*, and compare the calculated image brightness information to the preset image brightness information to calculate the brightness adjustment information of the light source, and send a light source control signal to a brightness control unit 247*e*;

the brightness control unit 247*e* configured to receive the light source control signal sent by the exposure algorithm unit 247*b*, and send an adjusting signal to a brightness adjusting circuit 243;

the brightness adjusting circuit 243 configured to receive the adjusting signal sent by the brightness control unit 247*e* and send a control signal to the assist light source 21 to control the brightness of the assist light source 21.

The digital microscope in the embodiment four further includes the assist light source which is at the lens module of the microscope. The assist light source faces the object.

The microscope controls the brightness of the light source in real time by the assist light source and the related control circuits provided in the embodiment four during the zooming and auto-focusing process of the microscope, which keep the displayed image have a proper brightness. If the user does not need the auto-adjustment of the brightness of the light source, he can set to the manual adjustment of the brightness of the light source.

As shown in FIG. 8, under the mode of the manual adjustment of the brightness, the difference is that it needs to connect the light source assist control unit to the interface unit 25. The light source assist control unit sends the brightness adjusting signal. After receiving the brightness adjusting signal, the interface unit 25 sends a light source control signal to the HCl unit 247*a*. The HCl unit 247*a* uses the exposure algorithm unit 247*b* to calculate the brightness adjustment information. The brightness control unit 247*e* adjusts the brightness of the assist light source 21 through the brightness adjusting circuit 243 according to the brightness adjustment information. The assist control unit can be achieved by the outer key board. The image signal outputted by the interface unit 25 is received and displayed by a display screen, a PC display or other display system.

Figure 15:
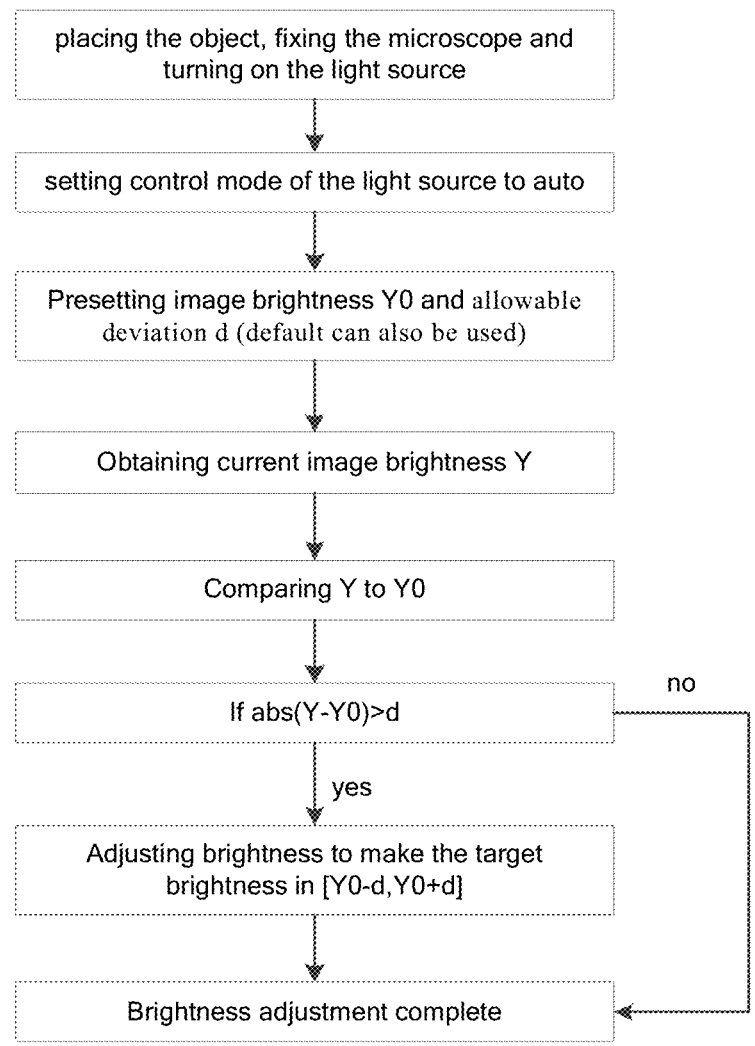
FIG. 15 is a flow chart of auto-adjustment of the brightness, according to an embodiment of the present disclosure.

To solve the fourth technical problem which the present disclosure solves according to the principle and structure of the digital microscope provided by the embodiment four, the flow chart of auto-adjusting brightness is shown in FIG. 15.

After turning on the assist light source, it needs to select auto-adjustment of the brightness or manual adjustment of the brightness. When the auto-adjustment of the brightness is selected, the program completes the brightness adjustment automatically, which is implemented by the following steps.

Step F1: preparation before turning on the digital microscope is that the object is placed on the stage 1, and the stage 1 and the main body 2 of the microscope are fixed and the light source is turned on and the display unit is connected.

Step F2: control mode of the light source is set to auto.

Step F3: the image brightness Y0 and allowable deviation d are preset.

Step F4: the current image brightness value Y is read from the image data processing unit 246*a* and is recorded.

Step F5: the exposure algorithm unit 247*b* compares the read brightness value Y to the preset image brightness Y0.

Step F6: if abs(Y−Y0)>d, then go to step F7, otherwise go to step F8.

Step F7: if the read brightness value Y is greater than threshold Y0+d, then reduce the brightness of the light source to make the image brightness value in the target brightness range [Y0−d, Y0+d]. If the read brightness value Y is smaller than threshold Y0−d, then increase the brightness of the light source to make the image brightness value in the target brightness range [Y0−d, Y0+d].

Step F8: the brightness adjustment is complete.

Under the mode of manual adjustment of the brightness, referring to the structure of the digital microscope in FIG. 8, the method for manually adjusting the brightness is followed.

Step G1: preparation before turning on the digital microscope is that the object is placed on the stage 1, and the stage 1 and the main body 2 of the microscope are fixed and the light source is turned on and the display unit is connected.

Step G2: control mode of the light source is set to manual.

Step G3: the brightness adjusting order (increasing the brightness or reducing the brightness) is sent to ARM processor 253 by the key board 247 on the interface unit 25 or the outer key board 3.

Step G4: ARM processor 253 translates the key information into orders which the microscope recognizes and sends the orders to the HCl unit 247a through serial ports.

Step G5: the HCl unit 247a uses the manual exposure algorithm, i.e., increasing the brightness, reducing the brightness in the exposure algorithm unit 247b.

Step G6: the brightness adjusting unit 247e adjusts the brightness of the assist light source 21 through the brightness adjusting circuit 243 according to the brightness adjustment information.

Step G7: manual adjustment of the brightness is complete.

Embodiment Five

FIG. 8 is the original block diagram of the embodiment five, which consists of the digital microscope and outer devices. The digital microscope of the embodiment five is incorporated with the functional modules of auto-focusing, zooming and brightness adjusting in the embodiment one, the embodiment two, the embodiment three, and the embodiment four and introduces some hardware-achievements for some functional modules correspondingly. For example, the image data processing unit 246a and the focus value calculating unit 246b can be integrated in a digital signal processor DSP in the embodiment five. In other embodiments, the hardware-achievement can be a large-scale programmable logic device or a central processing unit CPU, etc. Specific hardware-achievements are not limited in the present disclosure. The hardware-achievements which can achieve the corresponding functions disclosed by the present disclosure fall into the scope of the claims.

The microscope system provided by the embodiment five includes a stage 1, a main body 2 of the digital microscope and a display unit 4. The main body 2 of the digital microscope includes the assist light source 21, the lens module 22, the sensor board 23, the control unit 24 and the interface unit 25.

The lens module 22 includes the focusing (AF) lens unit 22b, the zooming (ZOOM) lens unit 22a, the zoom motor 22c, the focus motor 22d, the position detecting unit 22e and the position detecting unit 22f.

The control unit 24 includes the image data processing unit 246a, the focus value calculating unit 246b, the exposure algorithm unit 247b, the focus algorithm unit 247c, the zoom algorithm unit 247d, the motor control unit 247f, the zoom motor driving unit 244, the focus motor driving unit 245, the brightness control unit 247e, the brightness adjusting unit 243 and the HCl unit 247a.

The interface unit 25 includes:

a video signal converting unit 256 configured to convert the video signal from the LVDS interface 251 into the standard video output signal, such as high-definition-multimedia-interface (HDMI) video output signal; a HDMI interface 25 configured to output the video output signal to the outer display device;

ARM processor 253 configured to receive and recognize the control signal sent by the key board 257 on the interface unit 25, the control signal including the zoom control signal and the brightness adjusting signal; rs485 interface 254 configured to receive the control signals sent by ARM processor 253 and the outer key board 3 and send the control signal to ARM processor 253 and the outer key board 3.

The assist light source 21 is used for increasing amount of light when the brightness of the object is not enough to reduce the image noise. The assist light source 21 in the embodiment can be a ring-shaped light.

The lens module 22 is used for imaging. The focusing lens unit 22b and the zooming lens unit 22a in the lens module 22 can move freely under the drive of respective motors (the zoom motor 22c and the focus motor 22d) and have respective position detecting mechanisms (the position detecting unit 22e and the position detecting unit 22f) to detect the position of the lens unit. The position detecting unit 22e and the position detecting unit 22 can be configured to detect the position information of the zooming lens unit 22a and the focusing lens unit 22b respectively. Under the control of the control unit 24, the lens module 22 can achieve functions such as zooming, auto-focusing, brightness adjusting, etc.

The sensor board 23 is substantially an image sensor. It is used for converting optical signals into image signals and sending the image signals to the control unit 24.

The control unit 24 is a core component of the entire digital microscope system. It is mainly used for achieving the zooming control and the focusing control of the lens module 22 and brightness adjustment of the assist light source 21, outputting images through the interface unit 25 and achieving human-computer interaction function through the HCl unit 247a, etc.

The main function of the interface unit 25 is to send the image signal to the display unit 4 (display screen 4 in the embodiment four) through itself (through LVDS interface 251, the video signal converting unit 256, the HDMI interface 255 in the embodiment five), and send the control signal to the control unit 24 and the assist control unit 3 (the outer key board in this embodiment) through serial ports (through rs485 interface 254, ARM processor 253, rs232 interface 252 in this embodiment) to achieve human-computer interaction.

Although rs232 interface 242 and rs232 interface 252 are used in the embodiment five to achieve internal signal transmission between the HCl unit 247a and the interface unit 25, and LVDS interface 241 and LVDS interface 251 are used to achieve internal video signal transmission between the image data processing unit 246a and the interface unit 25, the present disclosure does not limit specific interface type and transmission way between internal modules. The internal interface function can also be incorporated within the corresponding module. For example, function of rs232 interface 242 can be incorporated within the HCl unit 247a, and function of LVDS interface 251 can be incorporated within the video converting chip, etc.

In the embodiment five, the image data processing unit 246a, the focus value calculating unit 246b in the control unit 24 can be achieved by DSP 246 or other compilers. The HCl unit 247a, the exposure algorithm unit 247b, the focus algorithm unit 247c, the zoom algorithm unit 247d, the brightness control unit 247e, the motor control unit 247f in the control unit 24 can be achieved by ARM processor 247 or other microelectronic processors.

In another specific embodiment of the present disclosure, the control unit is set outside the digital microscope. The image signal from the sensor board is directly outputted to the outer device including the control unit (hereafter the outer control device) through the interface unit. The outer control device performs the focus searching algorithm, the zoom tracking algorithm described in the above embodiments to the image signals, and outputs the motor control signal to the motor driving circuit in the main body of the digital microscope through the interface unit. The motor driving circuit drives the focus motor and the zoom motor to change the position of the focusing lens unit and the position of the zooming lens unit. The position detecting unit in the lens module feedbacks the position of the focusing lens unit and the position of the zooming lens unit to the control unit in the outer control device through the interface unit.

In summary, the present disclosure combines the zooming function, the auto-focusing function and the light source adjustment function of the conventional microscope together organically in an innovative way and achieves automation, intelligence, economy and convenient operation. The user only needs to turn on the power and put the object on the stage and set a suitable magnification using the zoom key. The rest are done by program automatically. This can avoid conventional steps such as the focusing step, step for switching the objective lens, and step for adjusting light source and it is simple and convenient.

Those of ordinary skill in the art can understand that implementing all or parts of the processes in the method of the embodiments described above may be accomplished by computer programs commanding the associated hardware. The computer programs can be stored in a computer-readable storage medium. When the programs are executed by one or more processors, the flows of the method in the above embodiments are included during the execution of the programs. The storage medium may be a magnetic disk, an optical disk, a read-only memory (ROM), a random access memory (RAM), or the like.

The first technical problem which an exemplary embodiment of the present disclosure solves is that, different from the way of the conventional microscope achieving focusing by moving the stage or the main body of the microscope to search the preset object distance u, the present disclosure controls a focusing lens unit in the main body of the microscope to move to search the image distance v with the fixed work distance, thereby achieving auto-focus.

The second technical problem which an exemplary embodiment of the present disclosure solves is that, different from the way of the conventional microscope achieving focusing with the fixed work distance, the present disclosure achieves auto-focus by changing the image distance with the changeable work distance.

The third technical problem which an exemplary embodiment of the present disclosure solves is that, different from the way of the conventional microscope using a mechanical mechanism to keep the image clear in the zooming process (the zooming process is actually a process of changing the image magnification, so it is also called changing magnification), the present disclosure achieves clear images by algorithms in the zooming process under each work distance with the changeable work distance.

The fourth technical problem which an exemplary embodiment of the present disclosure solves is that, different from the way of the conventional microscope adjusting brightness of the light source manually, the present disclosure can achieve auto-adjustment of the brightness of the light source.

It is intended that the equivalents of the claims of the present disclosure be covered by the scope of the present disclosure without departing from the scope of the disclosure as defined by the above embodiments of the present disclosure.

What is claimed is:

1. A focusing method of a digital microscope, comprising:
maintaining a position between an object and a main body of the microscope;
a control unit controlling a focusing lens unit in the main body of the microscope to move to make the microscope auto-focus by adjusting an image distance; and
outputting image data of the object through an interface unit in the main body of the microscope to a display,
wherein the control unit controlling the focusing lens unit in the main body of the microscope to move to make the microscope auto-focus by adjusting the image distance, comprises:
the control unit executing a focus searching algorithm to obtain a best focus value by the focus searching algorithm, the focus searching algorithm controlling a focusing motor in the main body of the microscope to drive the focusing lens unit in the main body of the microscope to make the focusing lens unit move to a position corresponding to the best focus value under control of the focus searching algorithm,
in which,
the focus searching algorithm comprises a raw focus searching algorithm and a fine focus searching algorithm;
the raw focus searching algorithm searches a range corresponding to the best focus value using an adaptive step which is larger than a step used in the fine focus searching algorithm, and drives the focusing lens unit into the range corresponding to the best focus value; and
the fine focus searching algorithm searches the position corresponding to the best focus value in the range determined by the raw focus searching algorithm using a fixed step and drives the focusing lens unit to the position corresponding to the best focus value.

2. The method of claim 1, wherein adjusting the image distance, comprises:
searching the image distance by the control unit controlling the focusing lens unit in the main body of the microscope to move to make the microscope auto-focus with a fixed work distance of the microscope.

3. The method of claim 1, wherein adjusting the image distance, comprises:
changing the image distance by the control unit controlling the focusing lens unit in the main body of the microscope to move to make the microscope auto-focus with a changeable work distance of the microscope.

4. The method of claim 1, wherein adjusting the image distance, comprises:
changing the image distance by the control unit controlling a lens unit in the main body of the microscope to move to make the microscope auto-focus with a changeable work distance of the microscope in a continuous zooming process, the lens unit comprising the focusing lens unit and a zooming lens unit.

5. The method of claim 1, wherein the raw focus searching algorithm and the fine focus searching algorithm comprise acts of determining a focus value used in the focus searching algorithm, comprising:
after the focusing lens unit is driven by the control of the focus searching algorithm to a searching position, the control unit obtaining the image data of the object from a sensor board in the main body of the microscope;
dividing the image data into a plurality of sub areas and processing the image data corresponding to each sub area to obtain a high-frequency component focus value and a low-frequency component focus value corresponding to each sub area; and
analyzing the high-frequency component focus value and the low-frequency component focus value corresponding to each sub area by a preset focus value selection algorithm and determining whether the high-frequency component focus value or the low-frequency component focus value is selected to perform the focus searching to determine the best focus value.

6. The method of claim 4, further comprising:
the control unit controlling the zooming lens unit and the focusing lens unit in the main body of the microscope to move to make the microscope zoom by changing a focal length, which comprises:
receiving an outer zooming control signal through the interface unit; and
the control unit executing a zoom tracking algorithm according to the outer zooming control signal, the zoom tracking algorithm controlling a zoom motor and a focus motor to drive the zooming lens unit and the focusing lens unit to achieve zooming and the image formed by the microscope being kept clear by the zoom tracking algorithm in the zooming process.

7. The method of claim 6, wherein after the zooming is complete, the method further comprises:
after the zooming, the control unit executing the focus searching algorithm again to implement a more precise auto-focus.

8. The method of claim 1, further comprising auto-adjusting brightness of a light source, which comprises:
the control unit processing the image data obtained from a sensor board in the main body of the microscope to obtain image brightness information;
comparing the image brightness information to a preset brightness information and calculating brightness adjustment information; and
the control unit adjusting the brightness of an assist light source on the head of the main body of the microscope according to the brightness adjustment information.

9. The method of claim 8, further comprising:
receiving an outer brightness adjusting signal through the interface unit and sending the outer brightness adjusting signal to the control unit; and
the control unit further configured to achieve manual adjustment of the brightness of the assist light source according to the outer brightness adjusting signal.

10. The method of claim 5, wherein the raw focus searching algorithm comprises:
step C1: starting the raw focus algorithm, and initially, the focus motor controlling the focusing lens unit to move along one direction with step $|S_0|=a1$, and recording positions of the focusing lens unit and data of each image frame;
step C2: if an group of values in a plurality of groups of the high-frequency component focus values is greater than threshold T0, then going to step C3; if an group of values in a plurality of groups of the low-frequency component focus values is greater than threshold T1, then going to step C4, otherwise going to step C5;
step C3: selecting the greatest high-frequency component focus value as a focus evaluation value and setting $S_0=a1$, the focusing lens unit moving along an original direction with S0, and going to step C6;
step C4: selecting the greatest focus value as the focus evaluation value and setting $S_0=a2$, the focusing lens unit moving along the original direction with S0, and going to step C6;
step C5: selecting the greatest low-frequency component focus value as the focus evaluation value and setting $S_0=a3$, the focusing lens unit moving along the original direction with S0, and going to step C6;
step C6: if percent decline of the focus value is greater than threshold T2, then going to step C7, otherwise going to step C8;
step C7: the focusing lens unit moving along a reverse direction with step S0, i.e., setting $S_0=-S_0$ and going to step C8;
step C8: if the focusing lens unit finishes m-times reciprocating movements, then going to step C9, otherwise going to step C2;
step C9: reading the position D0 of the focusing lens unit when obtaining a range corresponding to the greatest focus value determined in the raw focus searching process, and determining a searching range for fine focusing to be $[D0-S_0, D0+S_0]$;
step C10: the focus motor controlling the focusing lens unit to move to the position D0; and
step C11: the raw focusing being complete, going to the fine focus searching algorithm.

11. The method of claim 10, wherein the fine focus searching algorithm comprises:
step D1: starting the fine focus searching, and initially, the focus motor controlling the focusing lens unit to move along one direction with step $|S_0|=a4$, and recording positions of the focusing lens unit and data of each image frame;
step D2: if an group of values in a plurality of groups of the high-frequency component focus values is greater than threshold T0, then going to step D3, otherwise going to step D4;
step D3: selecting the group of the greatest high-frequency component focus values as the focus evaluation values and setting $S_0=a4$, the focusing lens unit moving along an original direction with S0, and going to step D4;
step D4: selecting the group of the greatest low-frequency component focus values as the focus evaluation values and setting $S_0=a4$, the focusing lens unit moving along the original direction with S0;
step D5: if percent decline of the focus value is greater than threshold T2 or the position of the focusing lens unit being beyond the searching range $[D0-S_0, D0+S_0]$ for the fine focusing, then going to step D6, otherwise going to step D7;
step D6: setting $S_0=-S_0$, the focusing lens unit moving along a reverse direction with step S0, and going to step D7;
step D7: if the focusing lens unit finishes k-times reciprocating movements, then going to step D8, otherwise going to step D2;
step D8: reading the position D1 of the focusing lens unit when obtaining the greatest focus value in the fine focus searching process, and the position D1 determined in this step being the position of the focusing lens unit when obtaining the best focus value after completion of focus searching;
step D9: the focus motor controlling the focusing lens unit to move to the position D1; and
step D10: the fine focusing being complete and the focusing being done.

12. A digital microscope, comprising:
a main body;
an object;
a lens module, comprising a focusing lens unit, a focus motor and a lens-unit-position detecting unit, the focus motor configured to drive the focusing lens unit to move under the control of a control unit; the lens-unit-position detecting unit configured to detect the position of the focusing lens unit and send position information of the focusing lens unit to the control unit;

a sensor board, configured to convert optical signals into image signals and output the image signals to the control unit;

the control unit, configured to process the image signals when the object and the main body of the digital microscope are fixed, and control the focus motor to drive the focusing lens unit to move by executing the focus searching algorithm, and make the microscope auto-focus by adjusting an image distance; and an interface unit, configured to output image data of the object, wherein the control unit comprises a focus algorithm unit, configured to execute the focus searching algorithm and obtain a best focus value by the focus searching algorithm, a motor control signal generated by the focus searching algorithm being sent to a motor control unit, the focusing lens unit moving to the position corresponding to the best focus value under the control of the focus searching algorithm, and the focus algorithm unit comprises:

a raw focus algorithm sub unit, configured to search a range corresponding to the best focus value using an adaptive step which is larger than a step used in a fine focus searching algorithm, and drive the focusing lens unit by controlling the motor control unit into the range corresponding to the best focus value; and a fine focus algorithm sub unit, configured to search the position corresponding to the best focus value in the range determined by the raw focus searching algorithm using a fixed step and drive the focusing lens unit by controlling the motor control unit to the position corresponding to the best focus value.

13. The digital microscope of claim 12, wherein the control unit making the microscope auto-focus by adjusting the image distance is configured to search the image distance by controlling the focusing lens unit in the main body of the microscope to move to make the microscope auto-focus with a fixed work distance of the microscope.

14. The digital microscope of claim 12, wherein the control unit making the microscope auto-focus by adjusting the image distance is configured to change the image distance by controlling the focusing lens unit in the main body of the microscope to move to make the microscope auto-focus with a changeable work distance of the microscope.

15. The digital microscope of claim 12, wherein the control unit comprises:

an image data processing unit configured to receive and process the image signals obtained by the sensor board, and output the processed image data into an focus value calculating unit;

the focus value calculating unit being configured to process the image data, calculate the focus value corresponding to the image data and input the focus value into a focus algorithm unit;

the focus algorithm unit being configured to receive the position signal of the focusing lens unit sent by the lens-unit-position detecting unit and the focus value outputted by the focus value calculating unit;

the motor control unit being configured to convert the motor control signal from the focus algorithm unit into a driving signal of a motor driving circuit and send the driving signal to a focus motor driving circuit;

the focus motor driving circuit being configured to driving the focus motor according to the driving signal of the motor control signal to make the focusing lens unit move to the position corresponding to the best focus value.

16. The digital microscope of claim 15, wherein the image data processing unit is configured to divide the image data into a plurality of sub areas;

the focus value calculating unit is configured specifically to process the image data of each sub area and obtain a high-frequency component focus value and a low-frequency component focus value corresponding to each sub area; and the focus algorithm unit further comprises:

a focus value selection unit, configured to analyze the high-frequency component focus values and the low-frequency component focus values corresponding to each sub area by a preset focus value selection algorithm and determine whether the high-frequency component focus value or the low-frequency component focus value is selected to perform the focus searching to determine the best focus value.

17. The digital microscope of claim 15, wherein the lens module further comprises a zooming lens unit and a zoom motor, the zoom motor configured to drive the zooming lens unit to move under the control of the control unit;

wherein the lens-unit-position detecting unit is further configured to detect the position of the zooming lens unit and send the position information of the zooming lens unit to the control unit; and wherein the control unit is configured to change the image distance by controlling a lens unit in the main body of the microscope to move to make the microscope auto-focus with a changeable work distance of the microscope in a continuous zooming process, which achieves making the microscope auto-focus by adjusting the image distance, the lens unit comprising the focusing lens unit and the zooming lens unit.

18. The digital microscope of claim 17, wherein the control unit is further configured to receive an outer zooming control signal through the interface unit, and be triggered by the outer zooming control signal to drive the zoom motor by executing a zoom tracking algorithm to control the movement of the zooming lens unit to make the microscope zoom;

wherein the control unit further comprises:

a human-computer interaction unit configured to receive the outer zooming control signal through the interface unit;

a zoom algorithm unit to receive the position information of the zooming lens unit and the focusing lens unit sent by the lens-unit-position detecting unit and the zooming control signal, and execute the zoom tracking algorithm, the motor control signal generated by the zoom tracking algorithm being sent to the motor control unit to make the zooming lens unit and the focusing lens unit move under the control of the zoom tracking algorithm to achieve zooming; and a zoom motor driving circuit configured to drive the zoom motor according to the driving signal of the motor control unit to make the zoom motor drive the movement of the zooming lens unit; and wherein the motor control unit is further configured to convert the motor control signal outputted by the zoom algorithm unit into the driving signal of the motor driving circuit and output the driving signal to the zoom motor driving circuit.

19. The digital microscope of claim 12, wherein the control unit comprises:

an exposure algorithm unit configured to calculate image brightness information according to the image data outputted by the image data processing unit, and compare the calculated image brightness information to preset image brightness information to calculate brightness adjustment information of the light source; and a brightness control unit configured to output a brightness control signal to a brightness adjusting circuit according to the brightness adjustment information of the light source;

the brightness adjusting being circuit configured to adjust power outputted to an assist light source according to the brightness control signal to adjust the brightness of the assist light source; and the main body of the microscope further comprising the assist light source which is at a side of the lens module of the microscope facing the object.

20. The digital microscope of claim 19, wherein the interface unit is further connected to the exposure algorithm unit and sends an outer brightness adjusting signal to the exposure algorithm unit in the control unit; and wherein the expose algorithm unit is configured to calculate the image brightness information according to the image data outputted by the image data processing unit, and compare the calculated image brightness information to the image brightness information to which the brightness adjusting signal needs to adjust, and calculate the brightness adjustment information of the light source and output the brightness adjustment information of the light source to the brightness control unit to achieve manual adjustment of the brightness of the assist light source.

21. The digital microscope of claim 16, wherein the raw focus algorithm sub unit is configured to execute following steps:

step C1: starting the raw focus algorithm, and initially, the focus motor controlling the focusing lens unit to move along one direction with step $|S_0|=a1$, and recording positions of the focusing lens unit and data of each image frame;

step C2: if an group of values in a plurality of groups of the high-frequency component focus values is greater than threshold T0, then going to step C3; if an group of values in a plurality of groups of the low-frequency component focus values is greater than threshold T1, then going to step C4, otherwise going to step C5;

step C3: selecting the greatest high-frequency component focus value as a focus evaluation value and setting $S_0=a1$, the focusing lens unit moving along an original direction with S0, and going to step C6;

step C4: selecting the greatest focus value as the focus evaluation value and setting $S_0=a2$, the focusing lens unit moving along the original direction with S0, and going to step C6;

step C5: selecting the greatest low-frequency component focus value as the focus evaluation value and setting $S_0=a3$, the focusing lens unit moving along the original direction with S0, and going to step C6;

step C6: if percent decline of the focus value is greater than threshold T2, then going to step C7, otherwise going to step C8;

step C7: the focusing lens unit moving along a reverse direction with step S0, i.e., setting $S_0=-S_0$ and going to step C8;

step C8: if the focusing lens unit finishes m-times reciprocating movements, then going to step C9, otherwise going to step C2;

step C9: reading the position D0 of the focusing lens unit when obtaining a range corresponding to the greatest focus value determined in the raw focus searching process, and determining a searching range for fine focusing to be $[D0-S_0, D0+S_0]$;

step C10: the focus motor controlling the focusing lens unit to move to the position D0; and step C11: the raw focusing being complete, going to the fine focus searching algorithm.

22. The digital microscope of claim 21, wherein the fine focus algorithm sub unit is configured to execute following steps:

step D1: starting the fine focus searching, and initially, the focus motor controlling the focusing lens unit to move along one direction with step $|S_0|=a4$, and recording positions of the focusing lens unit and data of each image frame;

step D2: if an group of values in a plurality of groups of the high-frequency component focus values is greater than threshold T0, then going to step D3, otherwise going to step D4;

step D3: selecting the group of the greatest high-frequency component focus values as the focus evaluation values and setting $S_0=a4$, the focusing lens unit moving along an original direction with S0, and going to step D4;

step D4: selecting the group of the greatest low-frequency component focus values as the focus evaluation values and setting $S_0=a4$, the focusing lens unit moving along the original direction with S0;

step D5: if percent decline of the focus value is greater than threshold T2 or the position of the focusing lens unit being beyond the searching range $[D0-S_0, D0+S_0]$ for the fine focusing, then going to step D6, otherwise going to step D7;

step D6: setting $S_0=-S_0$, the focusing lens unit moving along a reverse direction with step S0, and going to step D7;

step D7: if the focusing lens unit finishes k-times reciprocating movements, then going to step D8, otherwise going to step D2;

step D8: reading the position D1 of the focusing lens unit when obtaining the greatest focus value in the fine focus searching process, and the position D1 determined in this step being the position of the focusing lens unit when obtaining the best focus value after completion of focus searching;

step D9: the focus motor controlling the focusing lens unit to move to the position D1; and step D10: the fine focusing being complete and the focusing being done.

* * * * *